(12) United States Patent
Hercus

(10) Patent No.: US 7,412,426 B2
(45) Date of Patent: Aug. 12, 2008

(54) NEURAL NETWORKS WITH LEARNING AND EXPRESSION CAPABILITY

(75) Inventor: Robert George Hercus, Kuala Lumpur (MY)

(73) Assignee: Neuramatix SDN. BHD., Kuala Lumpur (MY)

( * ) Notice: Subject to any disclaimer, the term of this patent is extended or adjusted under 35 U.S.C. 154(b) by 0 days.

(21) Appl. No.: 10/560,666

(22) PCT Filed: Jun. 21, 2004

(86) PCT No.: PCT/IB2004/002119

§ 371 (c)(1),
(2), (4) Date: Dec. 12, 2005

(87) PCT Pub. No.: WO2004/114145

PCT Pub. Date: Dec. 29, 2004

(65) Prior Publication Data

US 2006/0149692 A1 Jul. 6, 2006

(30) Foreign Application Priority Data

Jun. 26, 2003 (MY) .............................. PI20032400

(51) Int. Cl.
*G06E 1/00* (2006.01)
*G06E 3/00* (2006.01)
*G06F 15/18* (2006.01)
*G06G 7/00* (2006.01)
(52) U.S. Cl. ...................................................... 706/15
(58) Field of Classification Search .................... 706/15
See application file for complete search history.

(56) References Cited

U.S. PATENT DOCUMENTS

| | | | | |
|---|---|---|---|---|
| 5,091,864 A | * | 2/1992 | Baji et al. | 706/42 |
| 5,166,539 A | * | 11/1992 | Uchimura et al. | 706/26 |
| 5,182,794 A | * | 1/1993 | Gasperi et al. | 706/25 |
| 5,353,383 A | * | 10/1994 | Uchimura et al. | 706/27 |
| 5,467,429 A | * | 11/1995 | Uchimura et al. | 706/26 |
| 5,671,335 A | * | 9/1997 | Davis et al. | 706/25 |
| 5,712,953 A | | 1/1998 | Langs | |
| 5,852,815 A | * | 12/1998 | Thaler | 706/16 |

(Continued)

FOREIGN PATENT DOCUMENTS

EP 0245508 B1 11/1987

(Continued)

OTHER PUBLICATIONS

Dynamic model of dual layer neural network for vertebrate retina Yagi, T.; Funahashi, Y.; Ariki, F.; Neural Networks, 1989. IJCNN., International Joint Conference on Jun. 18-22, 1989 pp. 787-789 vol. 1 Digital Object Identifier 10.1109/IJCNN.1989.118668.*

(Continued)

*Primary Examiner*—Michael B Holmes
(74) *Attorney, Agent, or Firm*—Kauth, Pomeroy, Peck & Bailey LLP

(57) ABSTRACT

A neural network comprising a plurality of neurons in which any one of the plurality of neurons is able to associate with itself or another neuron in the plurality of neurons via active connections to a further neuron in the plurality of neurons.

104 Claims, 18 Drawing Sheets

U.S. PATENT DOCUMENTS

| | | | |
|---|---|---|---|
| 5,937,432 A * | 8/1999 | Yamaguchi et al. | 711/154 |
| 6,052,679 A * | 4/2000 | Aparicio et al. | 706/15 |
| 6,195,622 B1 | 2/2001 | Altschuler et al. | |
| 6,456,993 B1 | 9/2002 | Freund | |
| 6,468,069 B2 | 10/2002 | Lemelson et al. | |
| 6,581,049 B1 * | 6/2003 | Aparicio et al. | 706/39 |
| 6,707,935 B2 * | 3/2004 | Kramer | 382/124 |
| 6,751,343 B1 | 6/2004 | Ferrell et al. | |
| 6,801,655 B2 * | 10/2004 | Woodall | 382/156 |
| 7,016,886 B2 * | 3/2006 | Cabana et al. | 706/39 |
| 7,089,217 B2 | 8/2006 | Kasabov | |
| 2005/0063565 A1 | 3/2005 | Nagaoka et al. | |
| 2006/0184462 A1 | 8/2006 | Hawkins | |
| 2007/0005531 A1 | 1/2007 | George et al. | |

FOREIGN PATENT DOCUMENTS

| | | |
|---|---|---|
| EP | 0223486 B1 | 8/1992 |
| EP | 0602717 A1 | 6/1994 |
| EP | 0276068 B1 | 4/1995 |
| EP | 0360674 B1 | 11/1995 |
| EP | 0453939 B1 | 7/1996 |
| EP | 0450522 B1 | 1/1997 |
| EP | 0450521 B1 | 3/1997 |
| EP | 0599347 B1 | 7/1998 |
| EP | 0506730 B1 | 11/1999 |
| EP | 0612033 B1 | 11/1999 |
| EP | 0583217 B1 | 5/2000 |
| EP | 0574936 B1 | 5/2002 |
| EP | 1197913 B1 | 9/2003 |
| EP | 1197914 B1 | 10/2003 |
| EP | 1351188 A1 | 10/2003 |
| WO | WO 95/00920 | 1/1995 |
| WO | WO 97/29437 A1 | 8/1997 |
| WO | WO00/36524 A1 | 6/2000 |
| WO | WO02/15125 A2 | 2/2002 |

OTHER PUBLICATIONS

Memory based processor array for artificial neural networks Youngsik Kim; Mi-Jung Noh; Tack-Don Han; Shin-Dug Kim; Sung-Bong Yang; Neural Networks,1997., International Conference on vol. 2, Jun. 9-12, 1997 pp. 969-974 vol. 2 Digital Object Identifier 10.1109/ICNN.1997.616157.*

Implementation of ANN on RISC processor array Hiraiwa, A.; Fujita, M.; Kurosu, S.; Arisawa, S.; Inoue, M.; Application Specific Array Processors, 1990. Proceedings of the International Conference on Sep. 5-7, 1990 pp. 677-688 Digital Object Identifier 10.1109/ASAP.1990.145502.*

Neural Network Based Memory Access Prediction Support for SoC Dynamic Reconfiguration Chtourou, S.; Chtourou, M.; Hammami, O.; Neural Networks, 2006. IJCNN '06. International Joint Conference on 0-0 0 pp. 2823-2829 Digital Object Identifier 10.1109/IJCNN.2006.247210.*

RAP: a ring array processor for multilayer perceptron applications Morgan, N.; Beck, J.; Allman, E.; Beer, J.; Acoustics, Speech, and Signal Processing, 1990. ICASSP-90., 1990 International Conference on Apr. 3-6, 1990 pp. 1005-1008 vol. 2 Digital Object Identifier 10.1109/ICASSP.1990.116058.*

Out-of-core backpropagation Diegert, C.; Neural Networks, 1990., 1990 IJCNN International Joint Conference on Jun. 17-21, 1990 pp. 97-103 vol. 2 Digital Object Identifier 10.1109/IJCNN.1990.137701.*

Learning algorithms for suppressing motion clutter in airborne array radar Johnson, J.D.; Li, H.; Culpepper, E.B.; Blasch, E.P.; Klopf, A.H.; Aerospace and Electronics Conference, 1997. NAECON 1997., Proceedings of the IEEE 1997 National vol. 2, Jul. 14-17, 1997 pp. 840-845 vol. 2 Digital Object Identifier 10.1109/NAECON.1997.622738.*

Hopfield associative memory on mesh Ayoubi, R.A.; Ziade, H.A.; Bayoumi, M.A.; Circuits and Systems, 2004. ISCAS '04. Proceedings of the 2004 International Symposium on vol. 5, May 23-26, 2004 pp. V-800-V-803 vol. 5.*

C-NNAP: a dedicated platform for binary neural networks Kennedy, J.V.; Austin, J.; Pack, R.; Cass, B.; Artificial Neural Networks, Fifth International Conference on (Conf. Publ. No. 440) Jul. 7-9, 1997 pp. 161-166.*

Minimisation of torque ripple in a switched reluctance motor using a neural network Reay, D.S.; Green, T.C.; Williams, B.W.; Artificial Neural Networks, 1993., Third International Conference on May 25-27, 1993 pp. 224-228.*

The chaos in the synchrony of abnormal oscillations in a pair of neurons coupled via gap junction Ge Manling; Guo Hongyong; Dong Guoya; Jia Wenyan; Li Ying; Sun Minggui; Wang Baozhu; Yan Weili; Signal Processing, 2004. Proceedings. ICSP '04. 2004 7th International Conference on vol. 3, Aug. 31-Sep. 4, 2004 pp. 2210-2213 vol. 3.*

Hardware realization of novel pulsed neural networks based on delta-sigma modulation with GHA learning rule Murahashi, Y.; Doki, S.; Okuma, S.; Circuits and Systems, 2002. APCCAS '02. 2002 Asia-Pacific Conference on vol. 2, Oct. 28-31, 2002 pp. 157-162 vol. 2 Digital Object Identifier 10.1109/APCCAS.2002.1115144.*

Curvature and orientation estimation by neuronal structures Tanaka, J.S.; Manoel, E.T.M.; da Fontoura Costa, L.; Computer Graphics and Image Processing, 2000. Proceedings XIII Brazilian Symposium on Oct. 17-20, 2000 pp. 44-51 Digital Object Identifier 10.1109/SIBGRA.2000.883893.*

Basic characteristics of hardware neuron model based on CMOS negative resistance: realization of post-inhibitory rebound firing and its application Kanoh, S.; Kumagai, H.; Futami, R.; Hoshimiya, N.; Neural Information Processing, 1999. Proceedings. ICONIP '99. 6th International Conference on vol. 2, Nov. 16-20, 1999 pp. 579-584 vol. 2.*

International Search Report for International Application No. PCT/IB2004/002119, completed on Sep. 24, 2004, mailed Sep. 29, 2004.

International Preliminary Report on Patentability for International Application No. PCT/IB2004/002119, completed Feb. 25, 2005.

Humpert, B., "Bidirectional Associative Memory With Several Patterns", IJCNN 1990, Jun. 17-21, 1990, pp. I-741-I-750 and IEEE Xplore 1-page printout (11 pages), printed Sep. 22, 2004.

Wang, L., "Multi-associated neural networks and their applications to learning and retrieving complex spatio-temporal sequences", IEEE Transactions on Systems, Man and Cybernetics, Feb. 1999, printed Sep. 21, 2004.

Carpenter et al., "ART 2: Self-Organization of Stable Category Recognition Codes for Analog Input Patterns", Applied Optics, Dec. 1, 1987, vol. 26, No. 23, pp. 4919-4930.

Carpenter et al., "Adaptive Resonance Theory", The Handbook of Brain Theory and Neural Networks, Second Edition; Sep. 1998, pp. 1-12.

Fahlman et al., "The Cascade-Correlation Learning Architecture", source unknown, Feb. 14, 1990, pp. 1-13, title page.

* cited by examiner

NEURAL NETWORKS WITH LEARNING AND EXPRESSION CAPABILITY

FIELD OF INVENTION

This invention relates to neural networks and particularly, though not exclusively, to neural networks based on one or more characteristics including temporal, spatial, intensity, magnitude, and relative position; and may be used for one or more of: learning, knowledge acquisition, discovery, data mining and expression.

BACKGROUND OF THE INVENTION

Existing neural networks are typically based on a single interpretation of Hebbian learning. This basic, Hebbian concept is often stated as "Neurons that fire together wire together". The defacto interpretation is that wiring together is effected via the synapse that connects the two neurons together. The strength of the connecting synapse is modified or weighted to reflect the importance/probability of the presynaptic neuron firing concurrently with the postsynaptic neuron, or vice versa.

Using the concept, neural networks have been developed that associate a number of input neurons to a number of output neurons via synapses. The input neurons define the input states; and the output neurons define the desired output states.

Thus nearly all existing neural networks are based on the concept of three layers: an input neuron layer, a hidden neuron layer, and an output neuron layer. FIG. 1 and FIG. 2 are illustrations of existing neural networks.

Training of such neural networks is accomplished, in its most basic form, by applying a specific input state to all the input neurons, selecting a specific output neuron to represent that input state, and adjusting the synaptic strengths or weights in the hidden layer. That is, training is conducted assuming knowledge of the desired output. After training has been completed, the application of different input states will result in different output neurons being activated with different levels of confidence. Thus recognition of an input event depends on how close the original training states match the current input state.

Such neural networks typically require extensive, repetitive training with hundreds or thousands of different input states, depending on the number of desired output neurons and the accuracy of the desired result. This results in practical networks of the order of only 10,000 input and output neurons with as many as 10 million interconnecting synapses or weights representing synapses (current existing neural networks are very small in size as compared to the capacity of the human brain which has $10^{12}$ neurons, and $10^{16}$ synaptic connections).

Furthermore, existing networks are trained on the basis of generating predefined output neurons, and can subsequently recognise inputs that closely resemble the training sets used for input. Existing neural networks are not capable of independent learning as they are trained using prior assumptions—the desired goals are represented by the output neurons. Existing neural networks are not capable of expressing or recollecting an input state based on the stimulus of any output neuron in the output layer.

Existing neural networks are trained on the basis of applying independent input states, to the network, in which the order of training is typically insignificant. On completion of extensive, repetitive training, the output neurons are not significantly dependent on the order in which input states are applied to the network. Existing neural networks provide outputs that are based entirely on the current input state. The order in which input states are applied has no bearing on the network's ability to recognise them.

Existing neural networks may have some or all of the following shortcomings:
1. they require prior training, based on predetermined or desired output goals—they do not learn;
2. they can only recognise input states (objects) similar to the input states for which they have been trained;
3. they are highly computational, and therefore slow;
4. they are computationally restricted to represent only a relatively small number of neurons;
6. they need retraining if they are to recognise different objects;
7. they cannot express or recall an input object by applying a stimulus to the output neurons;
8. they are based on concurrent stimuli of all input neurons;
9. they are not creative and they cannot express or recollect events; they can only identify/recognise events for which they have been trained;
10. they assume neurons that fire concurrently or in quick succession, are linked synaptically but do not distinguish one from the other or the order of neuron firing; and
11. each hidden layer neuron can receive inputs from multiple input neurons concurrently.

SUMMARY OF THE INVENTION

In accordance with one aspect, there is provided a neural network comprising a plurality of neurons in which any one of the plurality of neurons is able to associate or associate with itself or any other neuron in the plurality of neurons via active connections to a further neuron in the plurality of neurons. This process is referred to as learning.

In accordance with a second aspect there is provided a neural network comprising a plurality of elemental neurons, and a plurality of structural neurons for representing associations between any pair of neurons, the pair of neurons being selected from the group consisting of: both elemental neurons, both structural neurons, one structural and one elemental neuron, and one elemental neuron and one structural neuron.

Each structural neuron may represent the combined information or memory represented by a pair of neurons. The process of recalling the pair of neurons that were combined to form a structural neuron is referred to as expression. Each structural neuron may receive input from only two neurons.

The plurality of elemental neurons may be represented in the root level of the neural network structure; and each elemental neuron may represent at least one of: an elemental stimulus, a defined elemental pattern, and a defined elemental data element. Each elemental neuron may represent one or both of: basic input stimuli and output stimuli of information being processed. Each elemental neuron may be an equivalent of a neuron in a brain, the neuron in the brain being selected from the group consisting of a sensor neuron, a motor neuron, an intracortical neuron and an intercortical neuron. The information represented by a neuron may be memory, and the processing may be learning or expression.

The plurality of neuron associations may be represented in a plurality of deeper neural levels. The number of levels in the plurality of deeper levels may be determined by the extent of the memory or pattern to be processed or expressed, where a memory represents a plurality of elemental neurons. The number of elemental neurons and structural neurons required to represent the memory may be determined by the nature of the memory to be processed.

In accordance with a third aspect there is provided a neural network comprising a plurality of neurons linked by associations, all associations of neurons in a level of the neural network that is the same or deeper being able to be expressed.

A fourth aspect provides a neural network comprising a plurality of neurons, each neuron being represented by a unique addressable node in an array.

A fifth aspect provides a neural network comprising a plurality of neurons, each neuron being represented in its entirety by a single node in an array.

A sixth aspect is a neural network comprising a plurality of nodes in an array, each node in the array comprising pointers. Each pointer is a data element of the node that represents a unique address of a specific node in the array, each address representing a neuron of a plurality of neurons. Each pointer represents a synaptic connection.

A seventh aspect there is provided a neural network comprising a plurality of neurons in an array, there being pointers in each node of the array for providing expression and for learning of memories.

A penultimate aspect provides a neural network comprising a plurality of neurons, each neuron being represented by a node in an array, each node having a plurality of pointers, each pointer in each node having a specific and unique function. Except where a pointer may represent the value of an elemental stimulus in the elemental or root level neurons, each pointer contains an address of another neuron. The number of pointers required may depend on the functions being performed by the neural network. For a neural network performing learning and expression functions, the number of pointers needed will be at least four.

In this manner each neuron in the plurality of neurons may be represented by a node of the same size in the array representing the plurality of neurons, each node containing a fixed number of pointers.

Nodes in an array used to represent neurons may also maintain additional data elements other than pointers pertaining to the characteristics of each neuron. Data elements may be defined to represent the frequency of each neuron's activation, the strength of its associations, and so forth.

The present invention also extends to a computer usable medium comprising a computer program code configured to cause one or more processors to execute one or more functions to perform the methods described above.

In a final aspect there is provided a neural network wherein the neural network is bi-directional and is enabled to operate in a forward direction where nodes are derived or created from input, and in a reverse direction where Input is derived from nodes. The forward direction is learning and the reverse direction is expression.

The neural network may be used for one or more of: monitoring and predicting stock price movements, Internet surveillance, Internet security, computer virus and spam detection, data compression, phrase recognition in speech and text, clauses in speech and text, plagiarism detection, bioinformatics, vision recognition, semantic analysis and representation of ontologies, and robotics.

BRIEF DESCRIPTION OF THE DRAWINGS

In order that the invention may be readily understood and put into practical effect there shall now be described by way of non-limitative example only preferred embodiments of the present invention, the description being with reference to the accompanying illustrative drawings in which.

DESCRIPTION OF PREFERRED EMBODIMENTS

According to a preferred aspect the present invention provides neural networks, and a method for constructing such neural networks via neuron associations, that are based on characteristics that Include at least one of temporal, spatial, intensity, magnitude, and relative position, for the formation of memories, that consist of one or both of either input stimuli (represented by elemental neurons) or output actions (represented by elemental neurons) in a natural manner.

It also provides for either or both of memory recollection and memory expression of one or more of the memories represented by structural neurons, which represent multiple elemental stimuli. The neural network allows for the potential expression of new actions or ideas other than what It has learnt and in such a manner may exhibit creativity. Input stimuli may include one or more of: audio, visual, tactile, and so forth. Output stimuli may include one or more of: movement, motion, speech, and so forth, each defined by appropriate elemental neurons.

Figure 1:
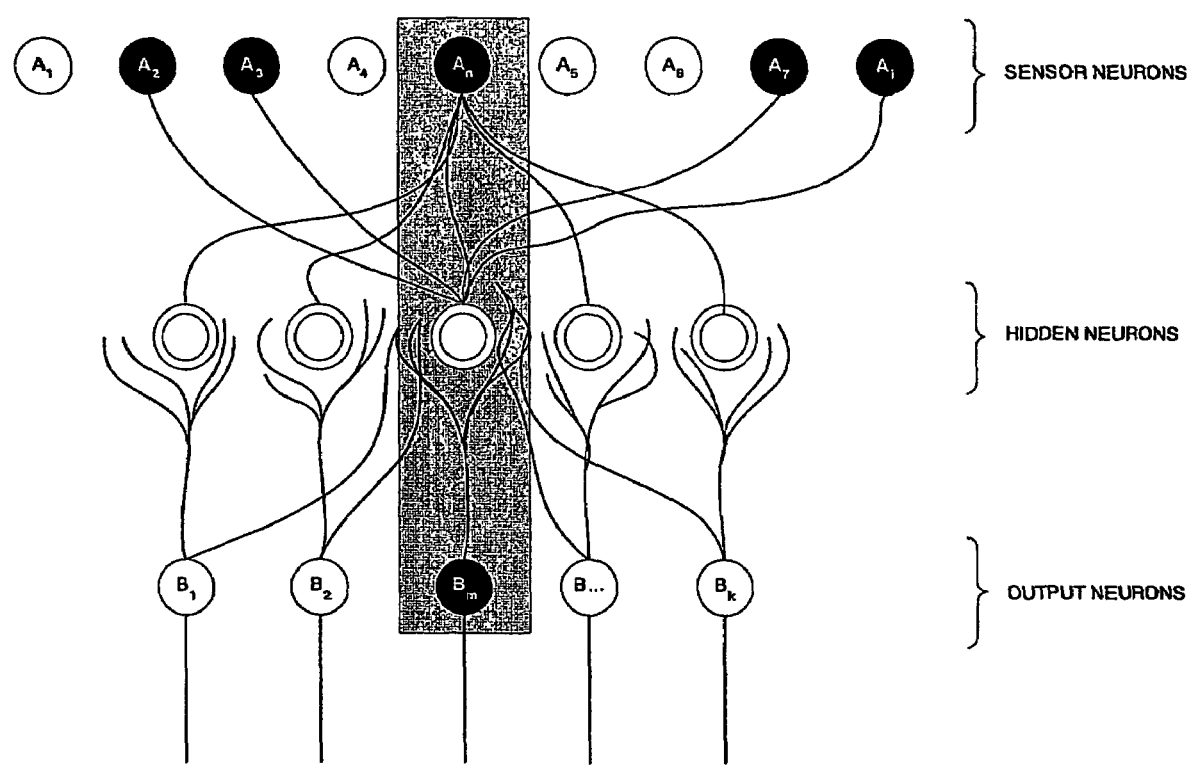
FIG. 1 is an illustration of an existing neural network structure.
Figure 2:
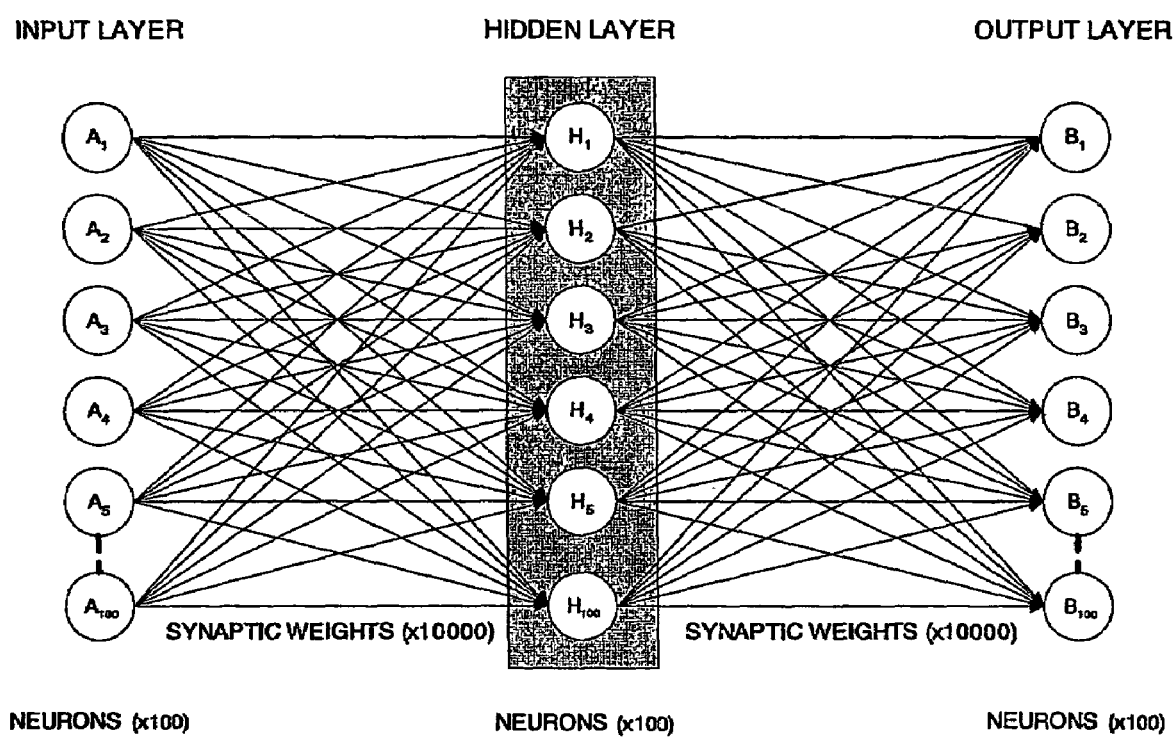
FIG. 2 is a further illustration of an existing neural network structure.
Figure 3:
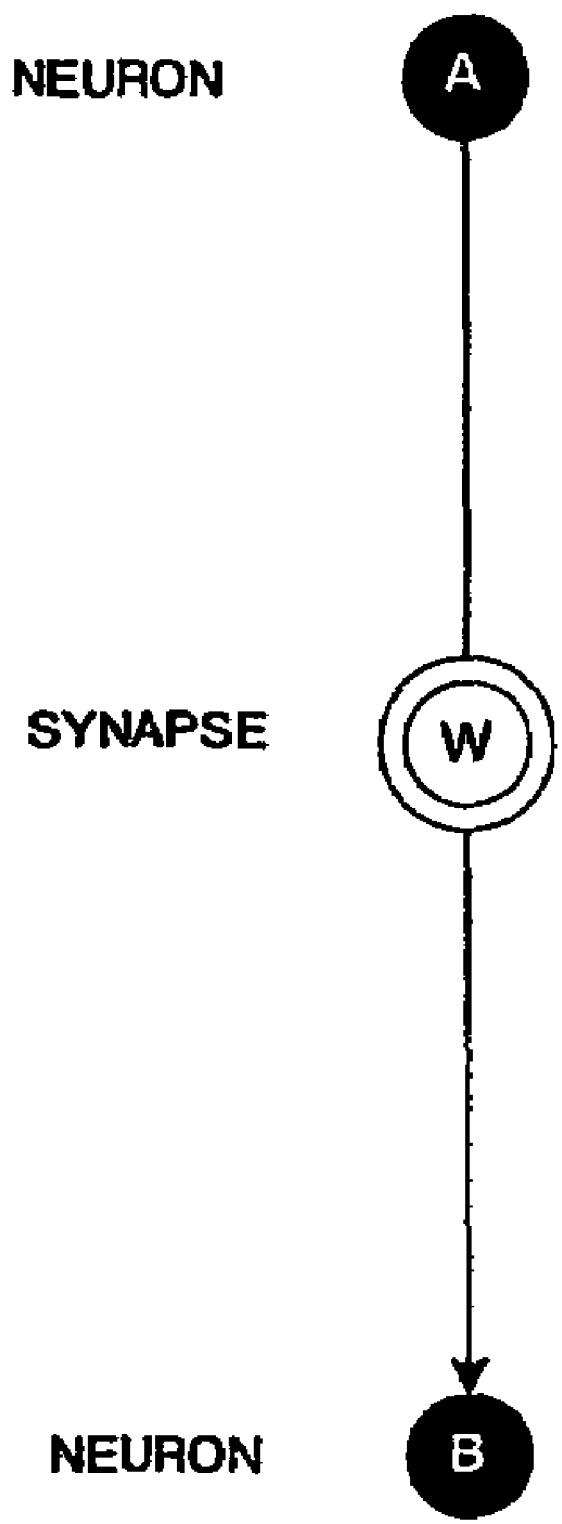
FIG. 3 is an illustration of an existing relationship between two neurons and a synapse.

Existing neural networks are based on the assumption that concurrently activating two neurons (neurons B and C) creates an active synaptic connection between them, or strengthens existing synaptic connections. This is illustrated in FIG. 3 where there are two neurons and one synapse.

Figure 4:
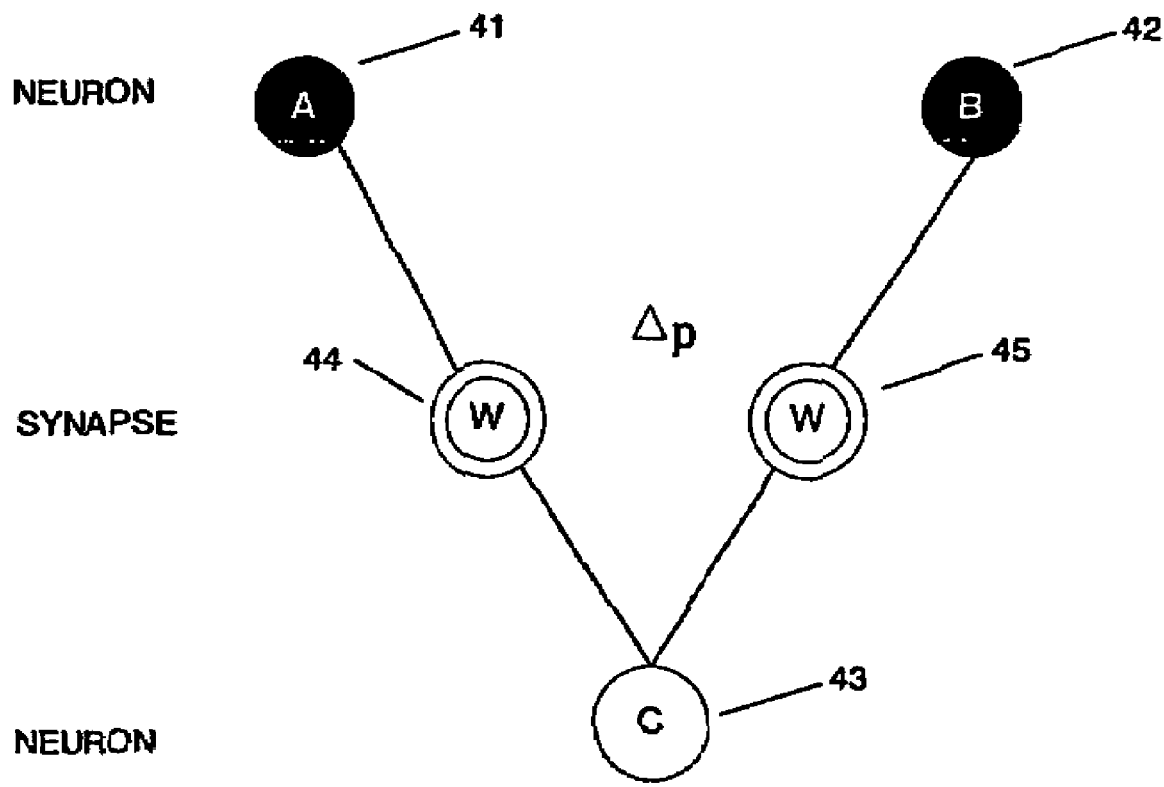
FIG. 4 is an illustration of the relationship between three neurons according to the present invention.

Accordingly to one aspect of the present invention, stimulating or activating two neurons creates an association between them via another third neuron; the associating neuron. This is illustrated in FIG. 4 where there are three neurons 41, 42 and 43 and two synapses 44 and 45. For convenience, this basic neural structure will be called a "neuronal assembly" throughout this specification. Neurons 41, 42 and 43 may be associated together based on proximal characteristics, Including at least one of temporal, spatial, intensity, magnitude and relative position. Neuron 43 will be at a deeper level within the neural structure than both of neurons 41, 42. Neurons 41,42 may be in the same level, or may be in different levels of the neural structure. The depth or level of a neuron in a neural network structure is based on the number of steps required to express the elemental neurons that it represents.

The neural structure comprises neurons, where each neuron represents a memory of data, events, objects, concepts or actions. The type of information represented by each neuron can vary, and is dependent on the elemental neurons (representing sensor and/or motor neuron stimuli) from which the neural network is constructed. Elemental stimuli are only represented in the elemental neurons maintained at the root levels of every neural network structure. Deeper or subsequent level neurons (structural neurons) only represent the association of other neurons and do not in themselves store sensor, motor or elemental stimulus values.

Each neuron in the neural structure may represent the association of only two neurons, one an initiating neuron and the other an associated neuron, although each neuron may participate as an initiating neuron and/or as an associated neuron in an unlimited number of associations, via associating neurons. An initiating neuron 41 can have any number of successor neurons such as neuron 43, where a successor neuron to neuron 41 is a associating neuron (43) that has neuron 41 as its initiating neuron. Another neuron 42 can have any number of precessor neurons, where a precessor neuron to neuron 42 is a associating neuron (43) that has neuron 42 as its associated neuron. Thus, neuron 43 can be referred to as an associating neuron, or a successor neuron to neuron 41, or as a precessor neuron to neuron 42.

The association is by one of the elemental neurons 41, 42 being an initiating neuron and one is an associated neuron. Assuming neuron 41 is the initiating neuron and thus neuron 42 is the associated neuron, when neuron 41 Is activated or fires associating neuron 43 is potentiated. At the same time as, or subsequent to neuron 41 firing neuron 42 is activated or fires and also potentiates associating neuron 43. Neuron 43 is then considered activated. If the associating neuron 43 was non existent (that is there existed no neuron associating the initiating neuron 41 and the associated neuron 42) then it is created and may be then activated, otherwise it is only activated. The proximal activation or firing of neurons 41 and 42 causes the activation of associating neuron 43, and the creation of active connections, or the strengthening of existing synaptic connections, between neurons 41 and 43 and neurons 42 and 43. The associating neuron 43 represents the sum of what is learnt from the other two neurons 41, 42. This sum may include one or more of a memory trace, a combination of the experience of the two, a sequence of events, a proximity of events and so forth. Once a associating neuron is activated or created to represent a desired memory or events, the desired memory or events need not be recreated in another neuron.

The definition of proximity or proximal activation or firing will be set by the rules of operation for each neural network. Proximity ("$\Delta P$") may vary across a level, and across levels, and may vary according to the type of elemental neuron being represented. Neurons at deeper levels within the neural network are less likely to be in close proximity, thus it is likely that $\Delta P$ will increase. If $\Delta P$ represents time or temporal events $\Delta P$ may be as short as zero, milliseconds or seconds, or as long as minutes, hours, days or weeks. Events that occur simultaneously in the real world may still be represented temporally based on differences In synaptic activation or firing times or the length of dendritic firing paths. It may also vary according to the processing requirements of the memories or events being represented by the neural structure. $\Delta P$ may also represent spatial relations between objects or events and can also represent the topological spatial relationships of neurons in the brain.

A neural network according to the present invention consists of two basic elements:
1. Elemental neurons, which can represent elemental stimuli, sensor or motor neurons or such elemental data as required or desired. These are the elemental or root neurons from which a neural network is constructed. Different types of elemental neurons may be defined depending on the type of experience or events or information being represented. For example if representing the auditory cortex the elemental neurons would be for representing distinct sounds. Elemental neurons may incorporate a number of different types of elemental neurons such as, for example, one set for representing sound energy or intensity of the sound (volume), and another set for representing the frequency of the sound.
If representing smell and taste there may be a set of elemental neurons for taste and another set for olfactory sensing.
In vision there may be sets of elemental neurons to represent the colour cones, rods, edges, contrast, movement, and so forth, as represented by the ganglion cells, or specifically to represent the photoreceptor neurons.
For skin receptors there may be elemental neurons corresponding to touch—mechanoreceptor neurons; temperature—thermo receptor neurons; pain—nociceptor neurons; and so forth. Motion can be represented by the various types of motor neurons that induce movement.
When a sensory neuron is activated or fires, it communicates to different areas of the brain via synapses or nerve cells that a certain form of energy from a specific cell or sensory organ at a specific location has been received. All sensory neurons have similar central processing mechanisms. When a motor neuron is activated or fired in the brain it induces muscle contraction at a specific location in the body thus producing movement. When a sensory neuron detects an event it passes the data to the brain where it is processed in the brain's neural structure.
Artificial elemental neurons may also be defined. For example, if using the neural structure to process English text, a set of elemental neurons may be defined to represent the alphabetic characters and punctuation characters. For the Chinese language, elemental neurons could be defined for each Chinese character, or a subset thereof. If using the neural structure to process protein sequences, the elemental neurons may be defined to represent the twenty amino acids, or subsets thereof. For speech, different motor neurons may be defined to produce different muscular contractions resulting in the production of sounds corresponding to phonemes, and so forth.
Elemental neurons can be initiating and associated neurons but cannot be a associating neuron.
2. Structural neurons representing the neural structure. The neural structure as illustrated in FIG. 4 consists of neurons that represent the association of other neurons, whether they are sensor neurons, motor neurons, or other structural neurons. In this manner neural structures can grow, representing more and more information.
Structural neurons can also be used to form associations between structural neurons representing different sets of elemental neurons. For example, an association may be formed between the English word "ball" represented by an association of alphabetic elemental neurons, with the shape "ball" represented by an association of visual elemental neurons. In this manner it is possible to build neural networks which allow the association of information across different cortexes or across different neural networks. Another association between the shape "ball" may exist with the spoken word "ball" represented by an association of motor neurons to enable phoneme neurons to produce the sound "ball".
Structural neurons are associated with each other on the basis of characteristics including temporal, spatial, intensity, magnitude and relative position. If representing speech with the neural structure, the associations would be of a temporal nature, representing the sequence of phonemes, words, phrases, clauses, and so forth, used in expressing speech. Likewise, if processing text or reading a book the processing of individual characters would be of a temporal nature building up the words, phrases, clauses, and so forth. Many neurons in the brain are also organised spatially or topographically, such as those for vision, hearing, touch, pain, and so forth. As such it is possible to construct neural structures that represent spatial characteristics. For example, in forming a neural structure representing a visual scene, neurons representing edges or lines or curves or objects or patterns may be associated into a neural structure that associates elemental neurons representing pixels into lines or curves based on proximity, near objects with far objects, or high objects with low objects, thus building a three dimensional map of the environment.

The same neural structure can be used to represent information in any of the four dimensions defined by space and time.

As above, the shape "ball"—represented by a spatial neural structure—may be associated with the spoken word "ball" represented by a temporal neural structure.

A structural neuron is a associating neuron. It can also be one or both of an initiating neuron and an associated neuron.

The combination of elemental neurons at the root levels of association within the neural structure allows for the creation of structural neurons that represent particular elemental features or characteristics within a cortex (neuronal assemblies). The neural structure allows for the representation of feature combinations by dynamic association within the neural structure. Neural activity in the neocortex that is evoked by sensory neurons is always distributed in the brain to different areas. In sensory systems, different areas of the brain can process different aspects (spatial/temporal/intensity/magnitude/relative position) of the same input stimuli. The proposed neural structure allows for intra-areal neural associations in order to represent coherent concepts/percepts and behaviour. Deeper levels of association within the neural structure (intra cortico-cortical associations) allows for the representation of increasingly complex information or behaviour.

Neurons may be organised, classified or named according to their functions, characteristics, levels, nature, and so forth. Neurons may also be defined for a particular dimension. That dimension may be time, distance, space, length, height, pitch, amplitude, or any other definable characteristic.

Within its particular dimension, any two neurons may be differentiated according to their relative or related occurrence, position, scale or magnitude. This relative positioning is represented by $\Delta P$.

The basic underlying parameter for constructing a neural network is that for any two active neurons A related to B by relative position there exists a third neuron C that has connections via synapses to both neurons A and B. If such a neuron doesn't exist then it is possible to create such a neuron and its connections. Therefore neuron C associates neurons A and B together maintaining their relative positions. A and B may be, but do not have to be, contiguous or consecutive within their relative positions. Therefore neuron C can associate any two neurons A and B which represent events whether the events are concurrent, contiguous, consecutive, non-contiguous, non-consecutive or overlapping.

The logic of the association is that for any two active neurons A and B that are activated or fire, one of them will be an initiating neuron. The third neuron C will associate the initiating neuron with the second neuron preserving their order of activation or firing. As such, neuron C represents the combined events of the initiating neural event followed by the second neural event. This new neuron C can subsequently participate in combining with other neurons (thus creating new associations), and so forth.

The basic rule for creating new neurons is that if neuron A is activated or fired, concurrent with or followed by neuron B being activated or fired, then a new neuron C can be constructed and possibly activated or fired, representing the association of neurons A and B (i.e. the association of events AB in time or space). If neuron C already exists due to a prior event or association then neuron C can likewise be re-activated and fired, allowing it to participate in subsequent existing or new activations, thereby allowing it to form new associations. This allows for the construction of neural networks with an unlimited numbers of associations and/or relationships.

Figure 5:
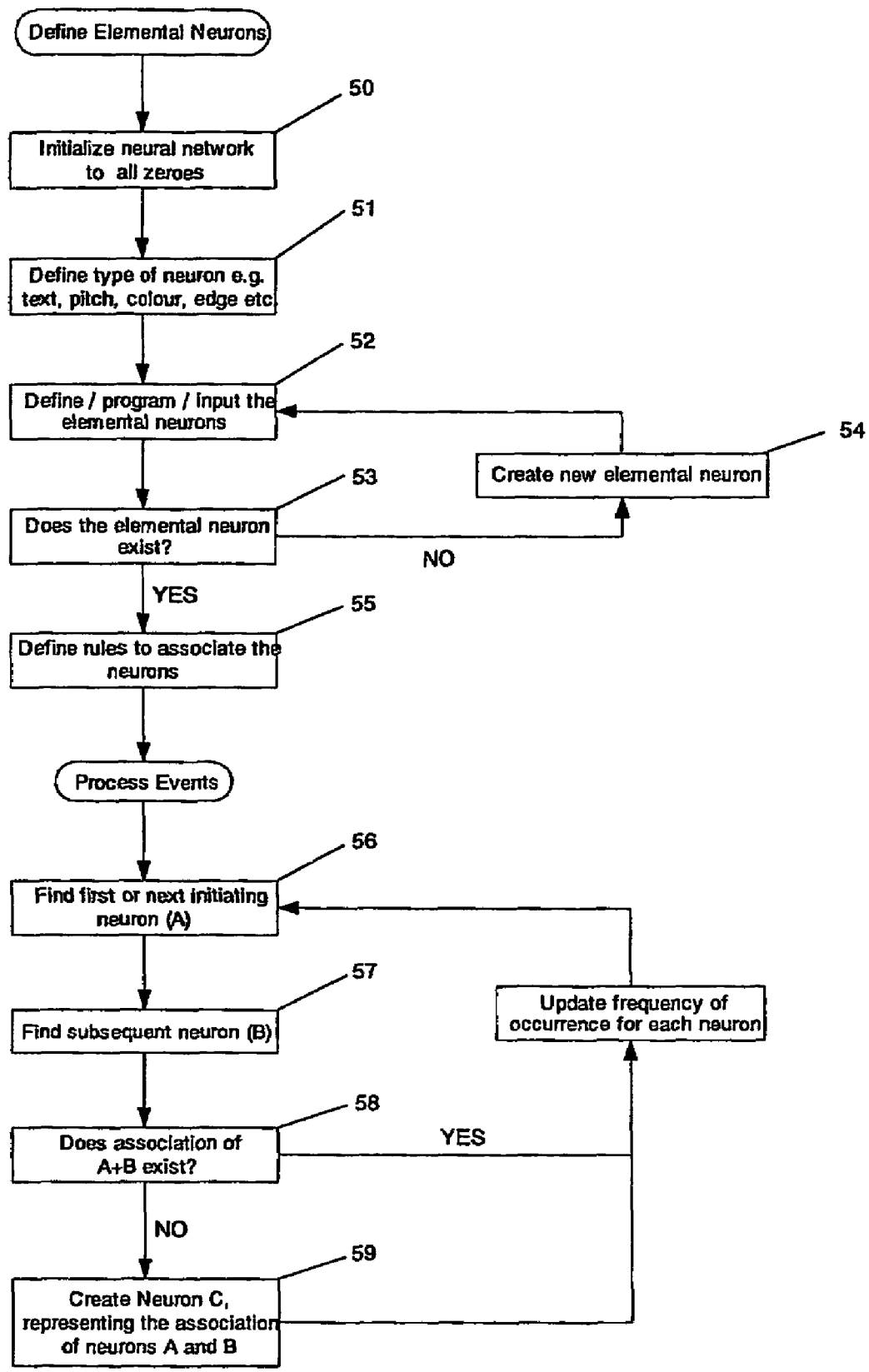
FIG. 5 is a flow chart of the process flow of the present invention.

A flowchart representing the basic flow for creating a new neural network is shown in FIG. 5. This preferred example shows the processing steps and application of the model for processing a simple sequence of elemental events.

In FIG. 5, the neural network or array representing the neural network is initialized at 50. At 51 the type or category of each elemental neuron is defined and may be related to, for example, text, vision pitch, colour, edge, sound, volume, taste, olfactory sensing, colour cones, rods, pain, contrast, movement, muscular movement, ganglion cells, photoreceptors, touch, mechanoreceptors, temperature, thermo-receptor, nociceptor, motion, language, characters, letters, words, and so forth.

The elemental neurons are then defined/programmed/input at 52. The question is then asked: does the elemental neuron already exist? (53). For each unique value to be represented for each defined type of defined elemental neuron, all elemental neurons must be created, and are attached as a list of successor neurons to the root neuron, the root neuron being represented by node zero in the array representing the neural network. If the answer to the query is no, a new elemental neuron is created (54) and the process returns to (52). If yes, the process continues to 55. Here, the rules to associate neurons is defined. Alternatively, new elemental neurons may be defined as and when they occur during the learning process.

The first, or next initiating, neuron Is then found (56). This is designated neuron A. The subsequent neuron (neuron B) is then found (57). If an association of neuron A and neuron B already exists (58), the process reverts back to 56. If not, a neuron C is created as representing the association or combination of neuron A and neuron B (59) and the process reverts back to 56. Neuron C can be referred to in this process as the associating neuron.

Figure 8:
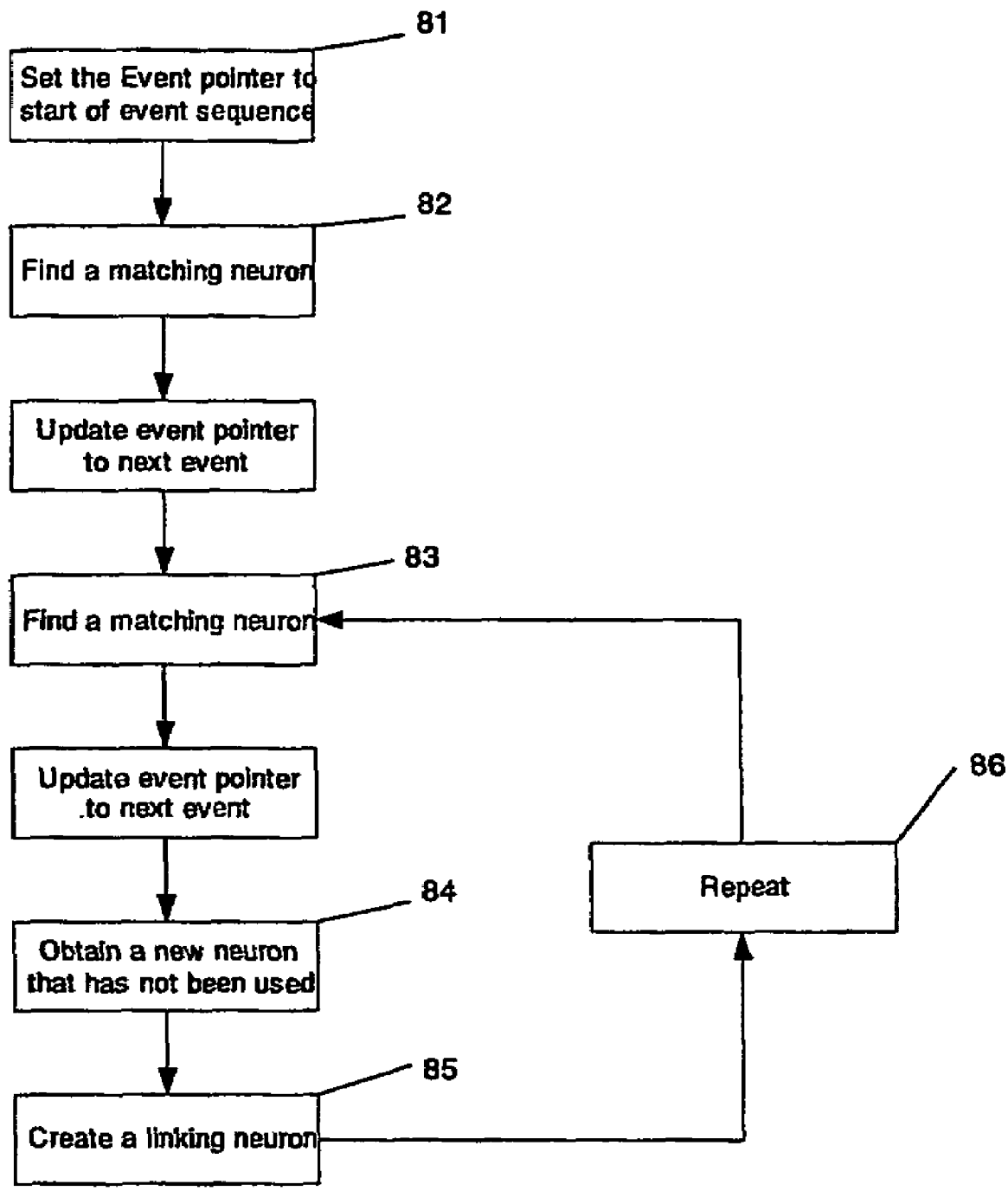
FIG. 8 is a flow chart for the learning process.

FIG. 8 is a flow chart providing more detail of steps 56 to 59 of FIG. 5. Here, neural processing or learning is of an experience represented by a pattern or sequence of elemental neuron events.

In step 81, the event pointer is set to the first elemental event in the event pattern or sequence. A matching neuron is found in step 82. The matching neuron is a neuron (memory) in the neural network that matches the leading event or events in the pattern or sequence of events pointed to by the event pointer. This matching neuron is defined as the initiating neuron (neuron A). The event pointer is then updated according to the defined rules for the neural network to point to the next event.

Another matching neuron is then found in step 83. Again, this neuron (memory) is for the event or events in the pattern or sequence of events pointed to by the event pointer. This another matching neuron is defined as the associated neuron (neuron B). The event pointer is then updated according to the defined rules for the neural network to point to the next event. In this manner new associating neurons or associations are always created, subject to any rules to the contrary. Generally the neuron C could not have previously existed, otherwise it would have been matched at step 82.

Having completed the processing of a single pass, the same data or event sequence may be processed again if so desired, extending the neural network structure accordingly.

A further neuron that has not been used is then found in step 84. This is created as the associating neuron (neuron C) in step 85. The process of steps 82 to 85 are repeated in 86 until there are no more events in the pattern or sequence of events being processed.

Figure 9:
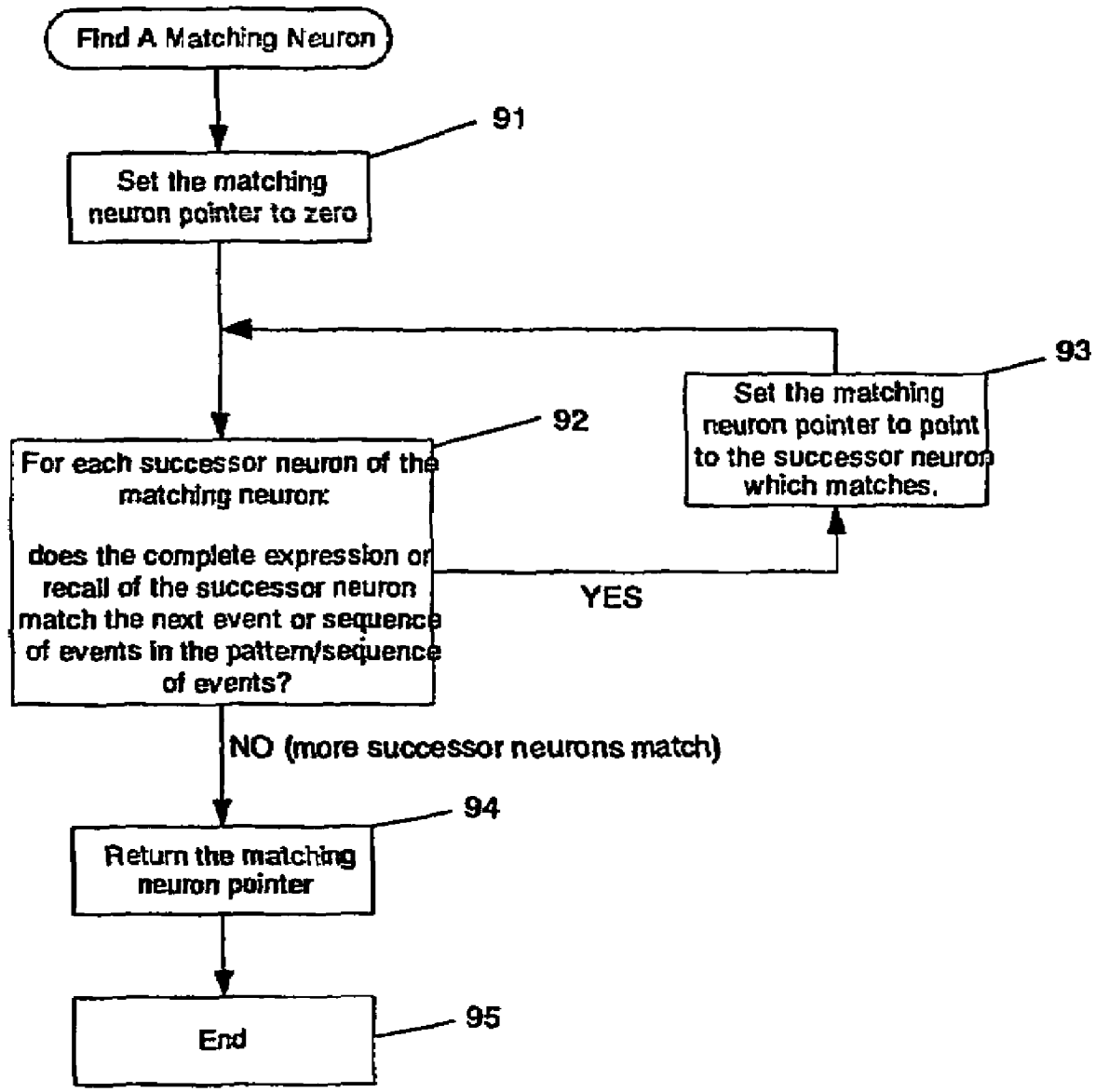
FIG. 9 is a flow chart for the matching process.

FIG. 9 provides more detail of the process steps 82 and 83 of FIG. 8—the finding of a matching neuron.

In step 91 the matching neuron pointer is set to zero by pointing to the root neuron. For each successor neuron of the matching neuron (step 91), a check is conducted to determine if the complete expression of the successor neuron matches the subsequent event or events or sequence in the pattern or sequence of events being processed. If it does, the process moves to step 93 where the pointer for the matching neuron is set to point to the successor neuron that matches the event pattern or sequence. In addition, the event pointer may be adjusted to point to the remainder of the pattern or sequence of events that, as yet, have not been matched. The process then reverts to step 92 and continues. If the result of step 92 is that it doesn't match, in step 94 the matching neuron pointer is returned pointing to the last matching neuron, and the process ends in step 95.

Figure 10:
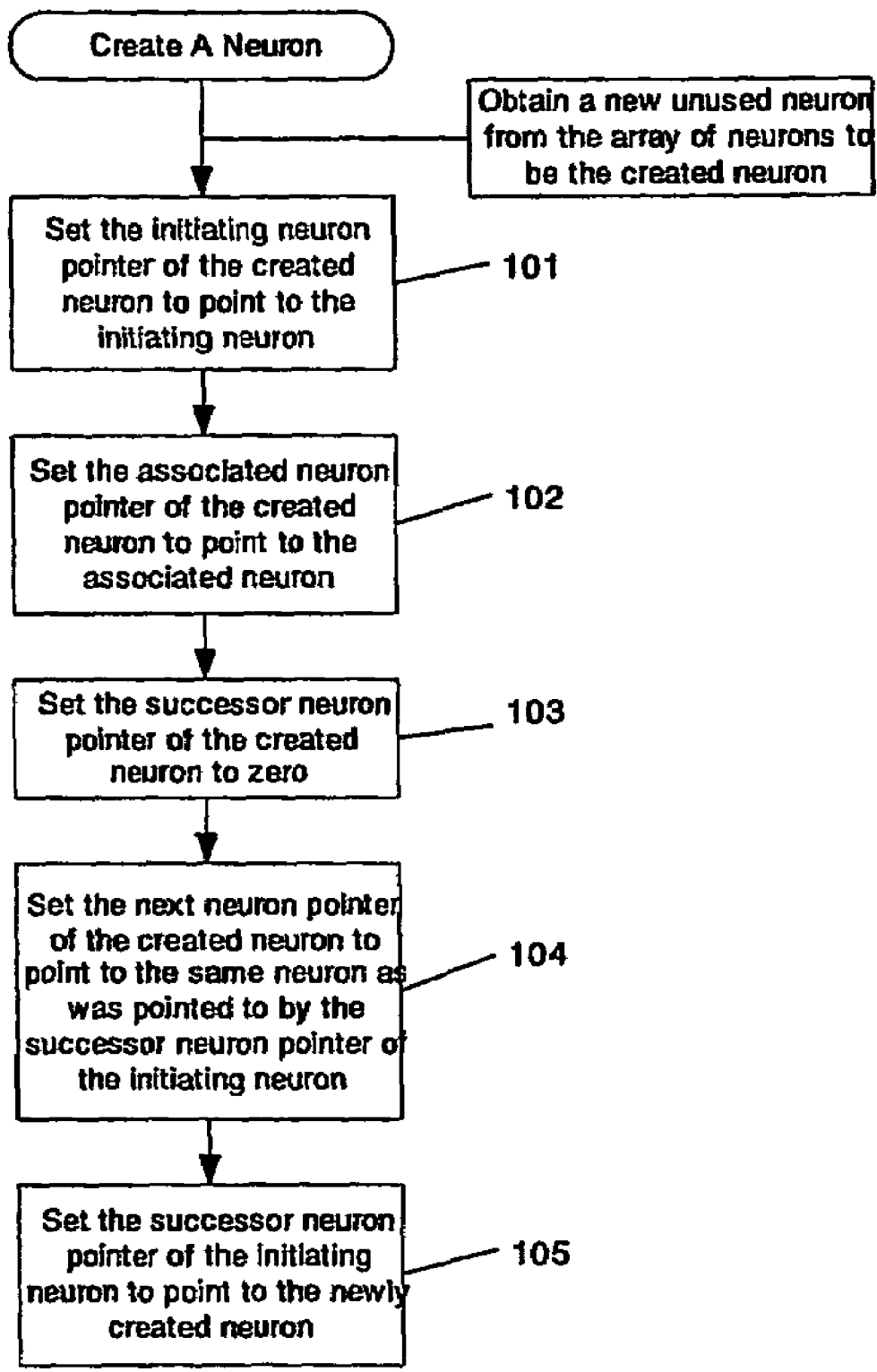
FIG. 10 is a flow chart for creating neurons during the learning process.

FIG. 10 illustrates in more detail the process of step 85 in FIG. 8—the creation of a associating neuron. In step 101, the initiating pointer of the associating neuron is set to the point to the initiating neuron, and in step 102 the associated neuron pointer of the associating neuron is set to the associated neuron. As the associating neuron has no successor neurons (having been just activated or created), its successor neuron pointer is set to zero (step 103). The next neuron pointer of the associating neuron is then set to be equal to the successor neuron pointer of the initiating neuron. Finally, in step 105, the successor pointer of the initiating neuron is set to point to the associating neuron and thus the associating neuron becomes the first entry in the list of successor neurons to the initiating neuron.

A group of elemental neurons representing a common characteristic may be organised into a cortex. Thus, it is possible to have a visual cortex containing groups of neurons which relate to a first visual characteristic (for example, a group of neurons for colour); a second group for second visual characteristic (for example, shape); a third group for a third visual characteristic (for example, size), and so forth. Structural neurons from one neural network, representing distinct patterns or events, can be elemental neurons in another neural network. Multiple cortexes, possibly represented by multiple neural networks (and the neurons within them), may be interlinked and related to form an integrated 'brain' which can provide not only an integrated learning environment, but also the potential for intelligent behaviour.

Traditional neural networks are typically unidirectional. This means that, given a certain input the output can be derived. However, they cannot work in the reverse direction. That is, given the output, it is not possible to derive the input.

The present invention provides for the capability for 'expression', whereby the sequence of events that leads to the construction of any neuron can be expressed. The importance of expression is that it allows a complete sequence of events to be represented by a single neuron, and that sequence can be reproduced by activating that single neuron and, in turn, the neurons that represent the association that is the initiating neuron and the associated neuron in the same relative position or order in which they were created, and so forth. In this manner it is possible for a single neuron representing a complete experience or memory (sequence of events) to be expressed, recalling the experience.

The expression ability is implemented by way of the initiating pointer and the associated pointer for each neuron in the neural structure.

Figure 11:
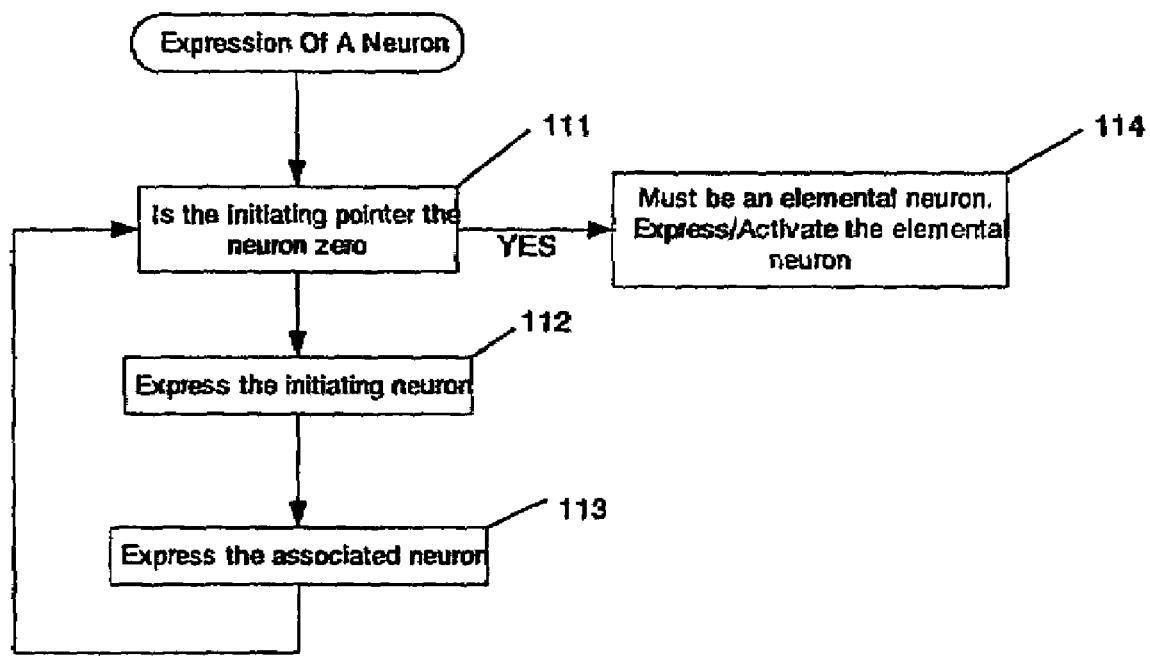
FIG. 11 is a flow chart of the process for expressing of neurons.

Expression is illustrated in FIG. 11. When expression is required, the first check in step 111 is to determine if the initiating pointer of the neuron to be expressed is equal to zero. If yes, it must be an elemental neuron and the process reverts to step 114 where expression is activation of the element event or value stored in the associated neuron to represent the elemental neuron. If the value is not zero, step 112 is started. In step 112 is expression of the neuron pointed to by the initiating neuron pointer of the neuron to be expressed. In step 113 is expression of the neuron pointed to by the associated neuron pointer of the neuron to be expressed. This continues until all elemental neurons representing the memory have been expressed.

Each neuron in the network has an address to identify its location within an addressable array of nodes where each node represents a single neuron. All neuron pointers refer to an address of a node representing a single neuron in the array of neurons. The bit size of the address or pointer will influence the maximum number of neurons possible to be represented in the array representing the neural network. For example: using a pointer address size of 32 bits will allow the construction of neural networks consisting of $2^{32}$ or 4,294,967,296 neurons.

Each neuron is represented by a single fixed length node in a conventional array or structure. The number of neurons that may be stored in an array will be dependent on the total memory storage available (internal and/or external), and on the pointer address architecture:

(a) a 16 bit pointer address architecture will allow for up to $2^{16}$ neurons. This is $6.4 \times 10^3$ neurons;

(b) a 32 bit pointer address architecture will allow for up to $2^{32}$ neurons. This is $4.1 \times 10^9$ neurons;

(c) a 48 bit pointer address architecture will allow for up to $2^{48}$ neurons. This is $2.7 \times 10^{14}$ neurons; and (d) a 64 bit pointer address architecture will allow for up to $2^{64}$ neurons. This is $1.8 \times 10^{19}$ neurons.

As the human brain has approximately $10^{12}$ neurons, it may be possible match the capacity of a hundred human brains using a 48 bit pointer address architecture. Based on the latest computers that support 64 bit addressing, it may be possible to have the capacity to represent neural structures consisting of $10^{19}$ neurons, the equivalent size of 10 million human brains wired together.

To represent the neural network, a node will consist of a minimum of four pointers. Each pointer contains an address to another neuron. As explained above, using an address size of 32 bits will allow the construction of neural networks consisting of up to $2^{32}$ or 4 billion, neurons.

Figure 6:
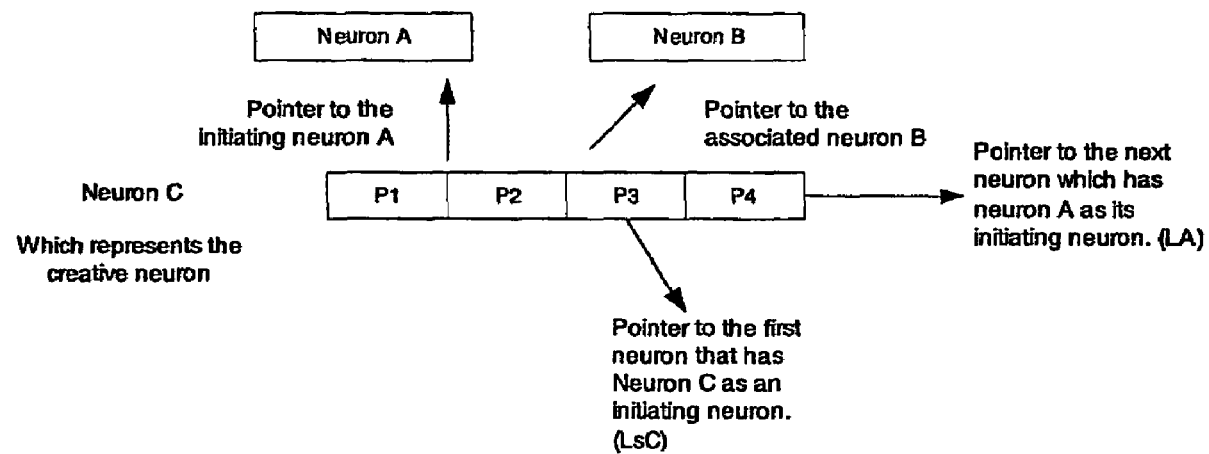
FIG. 6 is an illustration of the relationship between neurons and pointers/links.

As shown In FIG. 6, each neuron may be represented by four pointers/links ($P_1$, $P_2$, $P_3$ and $P_4$), in the most basic implementation. Each pointer is a link to the address or location of another neuron. Typically, a neuron will have four pointers, the minimum needed to create an intelligent neural network with expression capabilities. However, a neuron may have more than four pointers, to provide additional functionality. For example in creating neuron C to represent the association of an initiating neuron A and an associated neuron B, the following pointers are required for neuron C:

P1—a pointer to the initiating neuron, i.e. neuron A;
P2—a pointer to the other neuron that participates in forming the association, i.e. neuron B;
P3—a pointer to a list (LsC) of deeper level neurons that has neuron C as an initiating neuron (a successor pointer for neuron C); and
P4—a pointer to the next neuron,(LA) that has neuron A as its initiating neuron (a 'next successor' pointer for neuron A).

Additional pointers can also be defined for neuron C if necessary to provide information on the precessors to the associated neuron. For example:

P5—a pointer to a list (LpC) of deeper level neurons that has neuron C as an associated neuron (a precessor pointer); and
P6—a pointer to the next neuron in a list (LB) that has neuron B as its associated neuron (a 'next precessor' pointer).

Deeper level neurons may represent complex sequences of events. Since each structural neuron has at least one initiating neuron, and one associated neuron, a single neuron at level 10 may represent a sequence of up to $2^{10}$ or 1,024 elemental events. It is not a necessary condition that neurons can only associate with neurons of the same level.

Thus, in storing new sequences of events it is only necessary to identify those existing neurons which represent existing event sequences in the event stream and associate these together by constructing new neurons, e.g. if we have two event sequences of say 1,024 events and 512 events, respectively, it is possible to construct a single, new neuron to represent an event sequence of 1,536 events. Thus new sequence/event information can be economically represented in the neural network.

This is illustrated in FIG. 7. FIG. 7 is an illustration of a possible neural network derived from processing text and learning, for the sentence; "The cat sat on the mat." An arrowed line indicates the connection between an initiating neuron and a associating neuron, and a circled line indicates a connection between the associated neuron and the associating neuron.

Figure 7A:
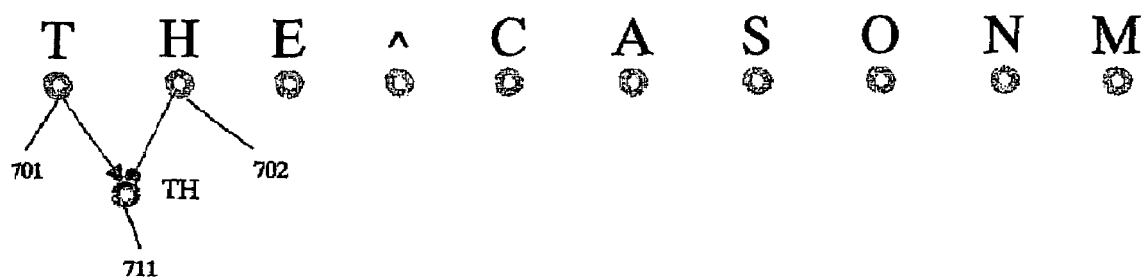
FIG. 7 is an illustration of a sequence of events to illustrate association.

In FIG. 7(a), the first elemental neuron 701 and the second elemental neuron 702 in level zero recognise or represent the letters "T" and "H" and associate to form the letter combination "TH" represented by the associating neuron 711 in level 1.

Figure 7B:
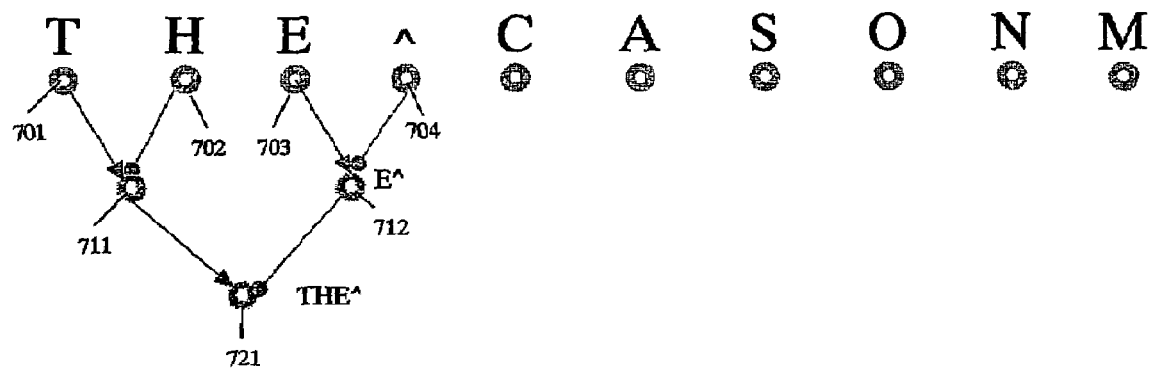

FIG. 7(b) shows the third elemental neuron 703 recognising the letter "E" and the fourth elemental neuron 704 recognising the space "^". These two associate together to form the combination "E^" represented by associating neuron 712 in level 1. The structural neurons 711 and 712 in level 1 associate to form the distinct word "THE^" represented by the associating neuron 721.

Figure 7C:
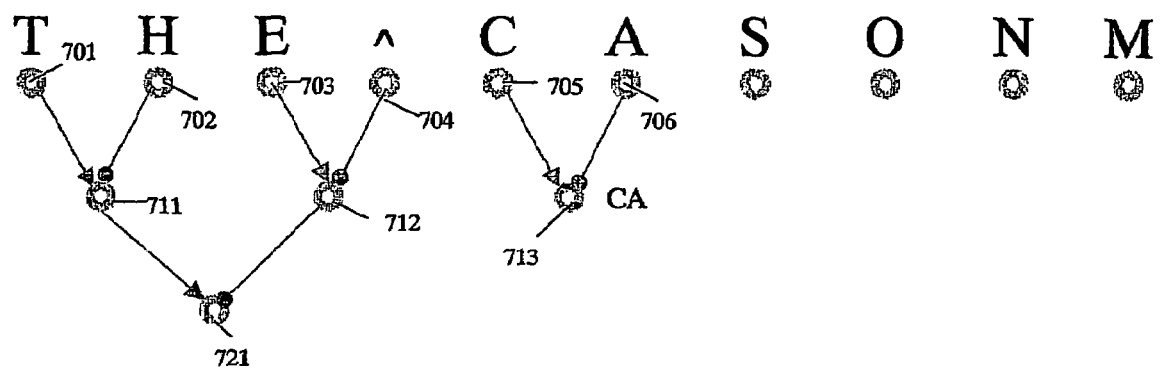
Figure 7D:
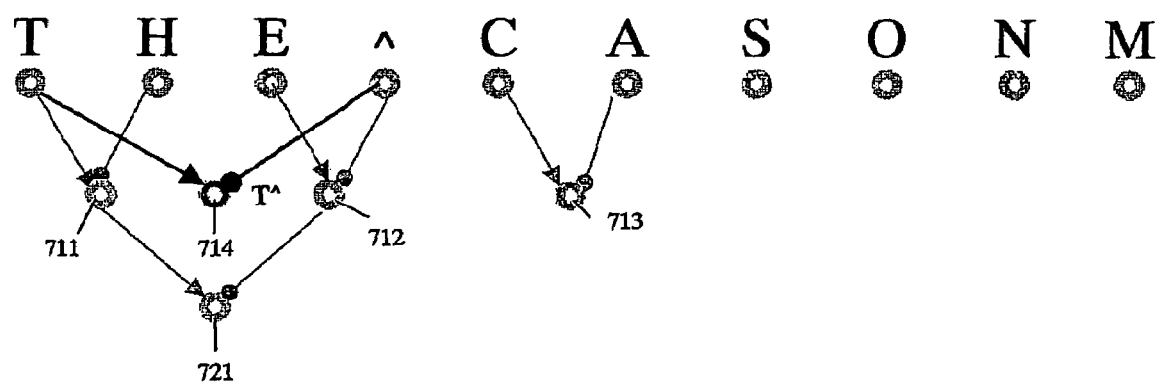
Figure 7E:
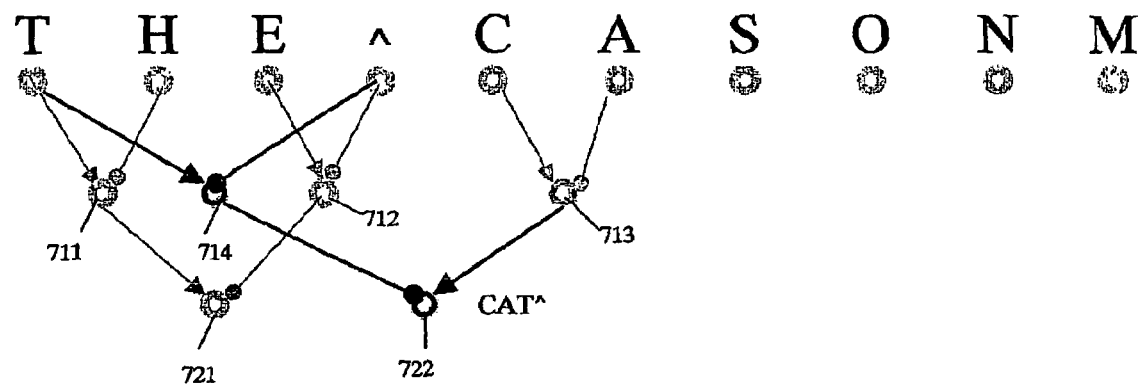
Figure 7F:
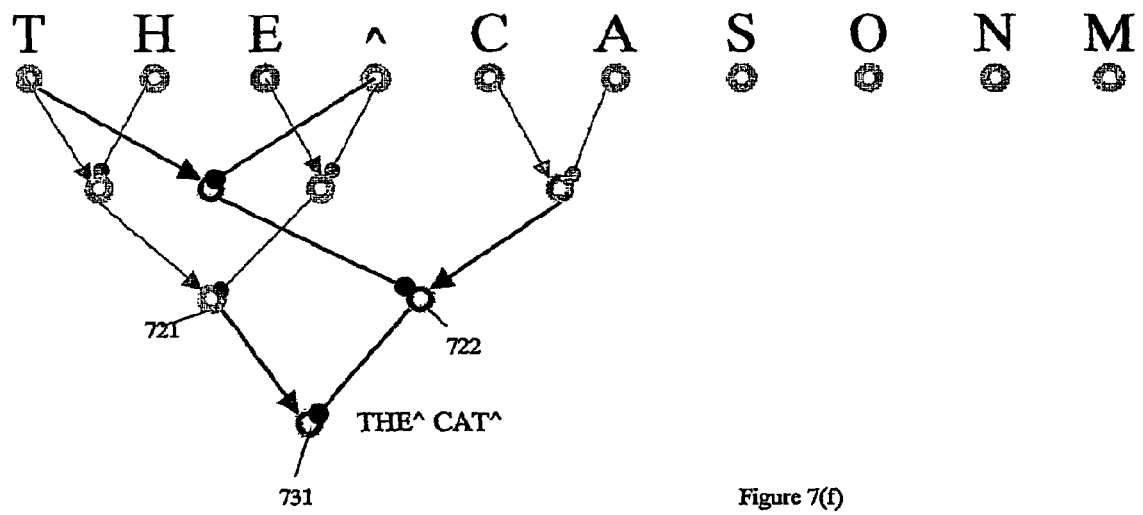
Figure 7G:
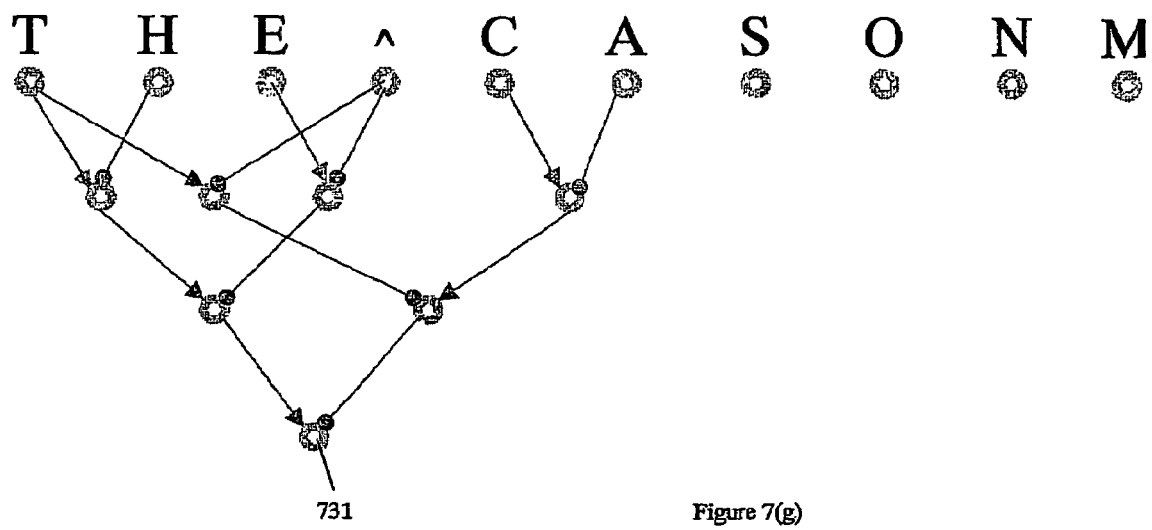

In FIGS. 7(c), (d) and (e), the next two elemental neurons In level zero—705 and 706—recognise the letters "C" and "A" respectively, and associate to form the letter combination "CA" represented by associating neuron 713 in level 1.

For the letters "T" and "^", neuron 701 associates with neuron 704 to create a associating neuron 714 in level 1 representing the combination "T^". Neurons 714 and 713 then associate to create a associating neuron 722 in level 2 thus forming the distinct word "CAT^" (FIG. 7(e)). Neurons 721 and 722 can then associate to give a result at the associating neuron 731 in level 3 to form the phrase "THE^CAT^" (FIGS. 7(f) and 7(g)).

Figure 7H:
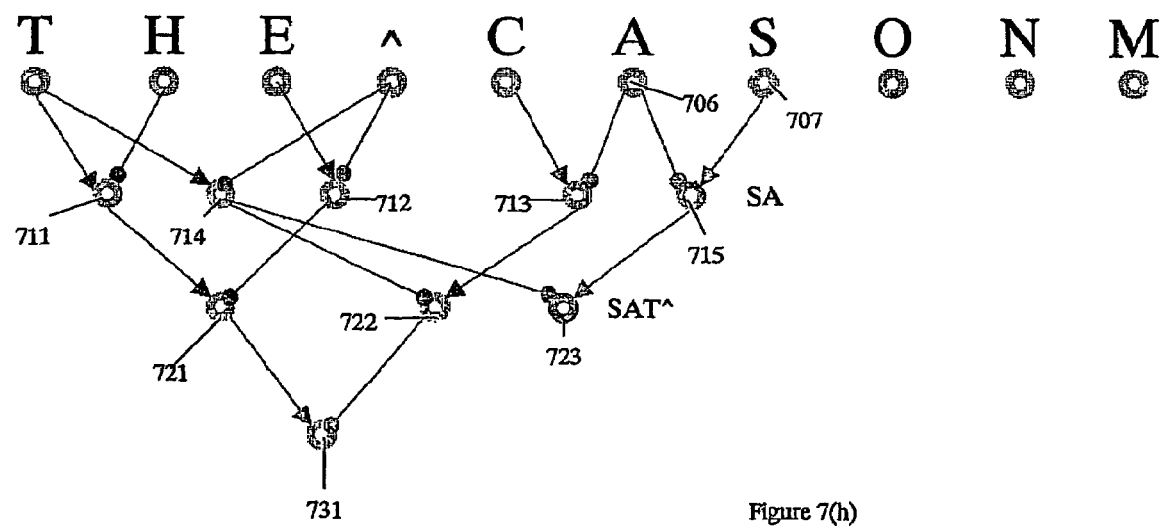

For the word "SAT^", as is shown in FIG. 7(h), neuron 707 recognises the letter "S" and associates with neuron 706 to give a result at associating neuron 715 in level 1 for the letter combination "SA". Neuron 715 associates with neuron 714 in level 1 ("T^") to give a result at associating neuron 723 in level 2 for the distinct word "SAT^".

Figure 7I:
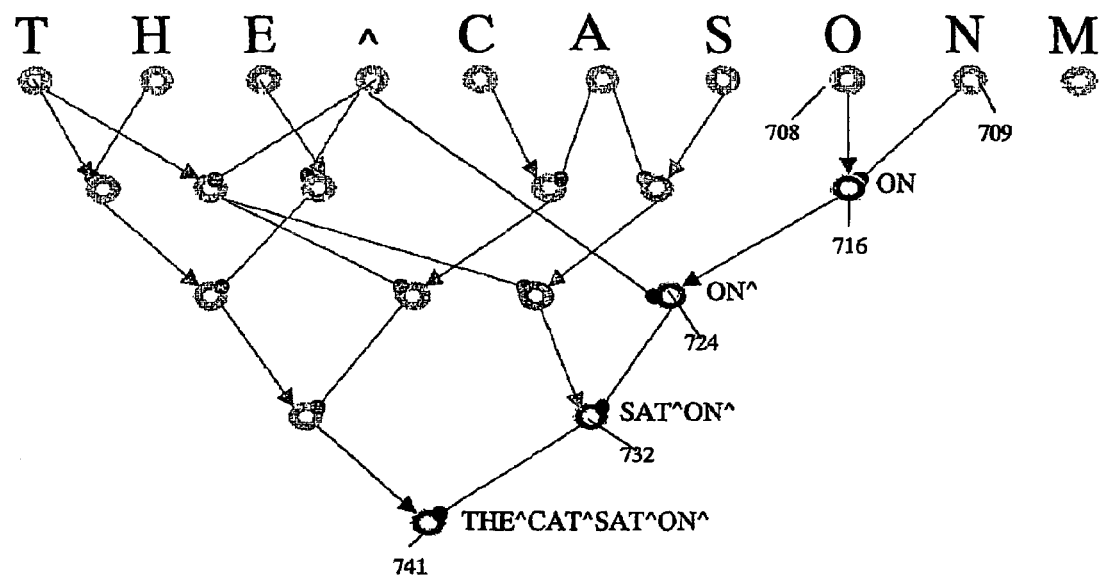
Figure 7J:
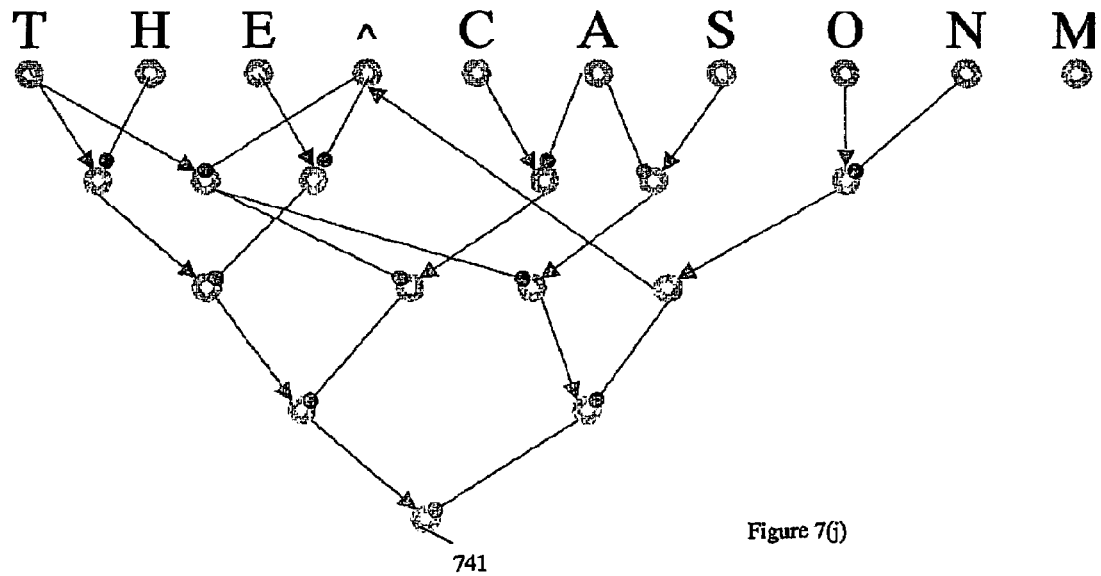

In FIGS. 7(i) and 7(j), neurons 708 and 709 recognise the letters "O" and "N" respectively and associate to form the letter combination (and word) "ON" represented by associating neuron 716 in level 1. Neuron 716 associates with neuron 704 to give a result at associating neuron 724 in level 2 for the distinct word "ON^". Neuron 723 in level 2 associates with neuron 724 to give a result at associating neuron 732 in level 3 for the clause "SAT^ON". Neurons 731 and 732 in level 3 may associate to give a result at neuron 741 in level 4 for the clause "THE^CAT^SAT^ON^".

Figure 7K:
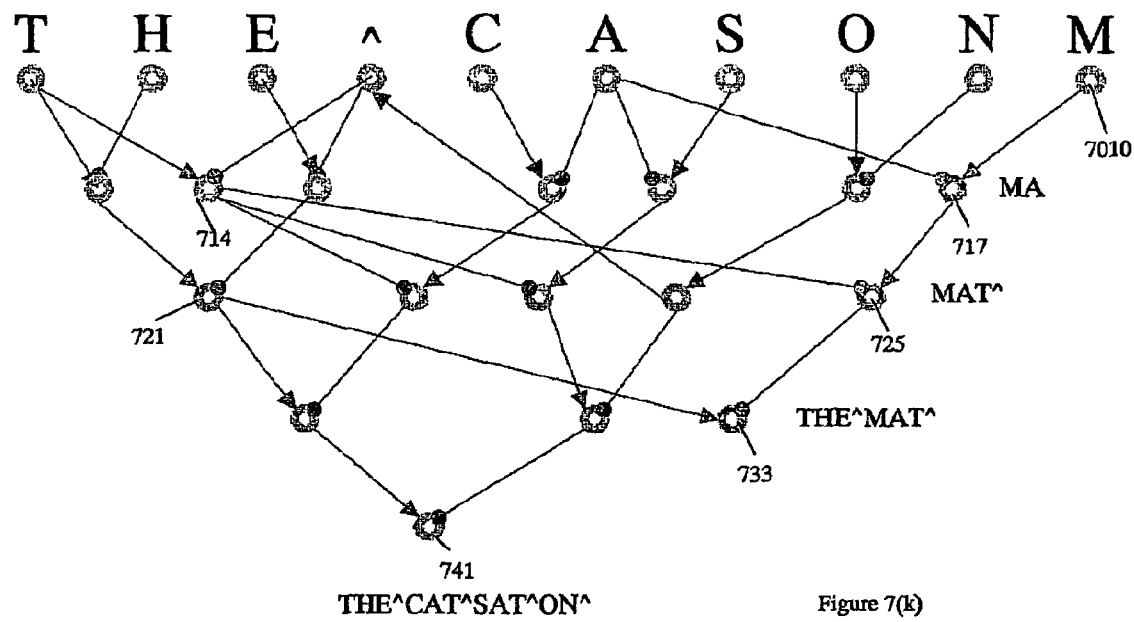
Figure 7L:
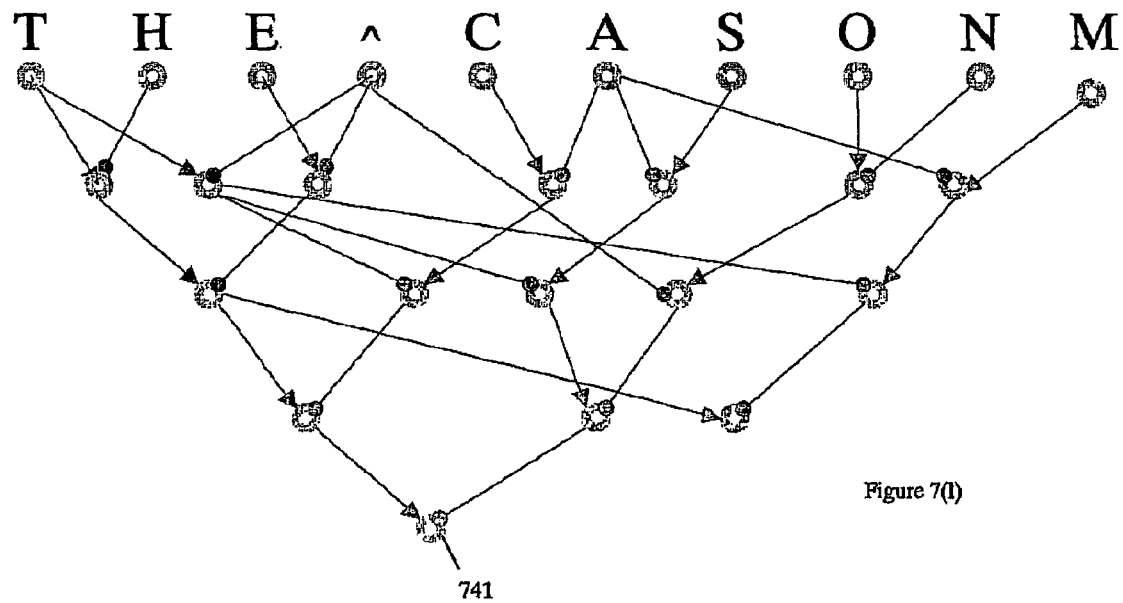

FIGS. 7(k) and (l) Illustrate neuron 7010 recognising the letter "M" and associating with neuron 706 to give a result at neuron 717 in level 1 for the letter combination "MA". Neuron 717 associates with neuron 712 ("T^") to give a result at neuron 725 for the distinct word "MAT^". Neuron 721 associates with neuron 725 ("THE^") to give a result at neuron 733 for the phrase "THE^MAT^".

Neurons 741 and 733 can associate to give a result at neuron 751 in level 5 for the sentence "THE^CAT^SAT^ON^THE^MAT". It is clear that each associating neuron has at most one initiating neuron and one associated neuron. However, neurons can have multiple successor and precessor neurons. For example elemental neuron 701 "T" has successor neurons representing "TH" (711) and representing "T^" (714). Elemental neuron 706 "A" has three precessor neurons representing "CA" (713), "SA" (715) and "MA" (717).

Figure 7M:
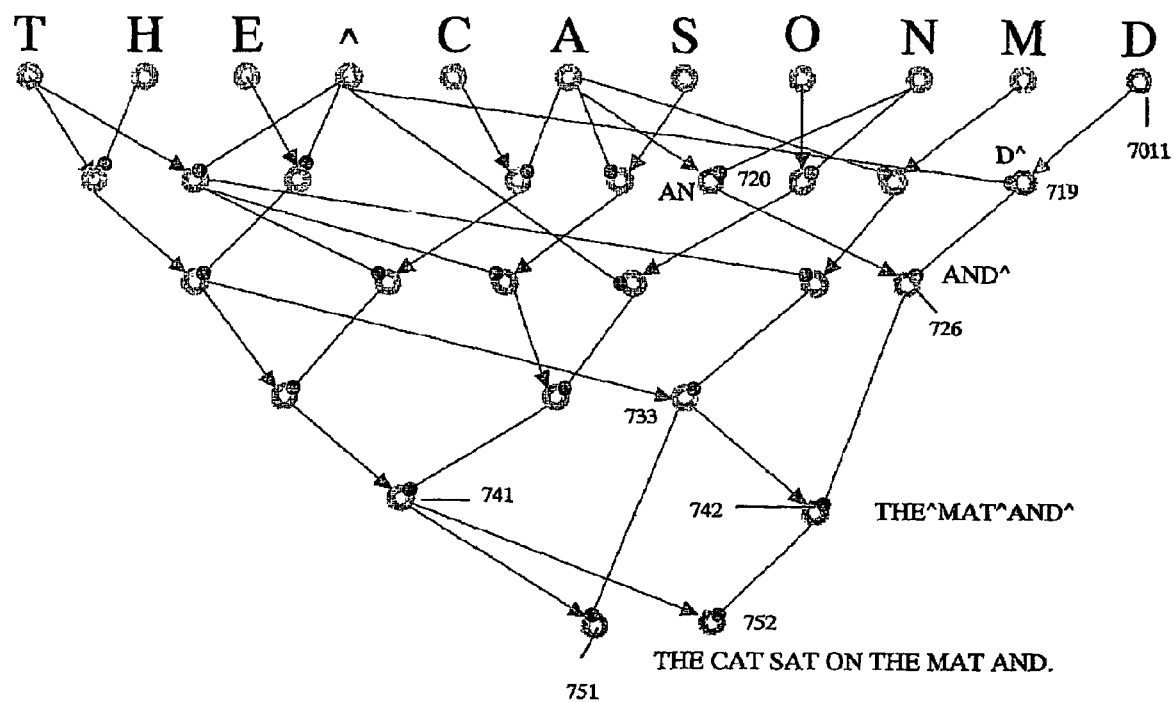

To extend the sentence illustrated in FIG. 7(m) where the neuron 7011 in level 0 recognises the letter "D". Neuron 7011 associates with neuron 704 to give a result at neuron 719 for the combination "D^". Neuron 706 associates with neuron 709 to give a result at neuron 720 for the combination "AN". Neuron 720 associates with neuron 719 to give a result at neuron 726 for the combination "AND^". Neuron 733 associates with neuron 726 to give a result at neuron 742 for the combination "THE^MAT^AND^". Neurons 741 and 742 may the associate to give a result at neuron 752 for the combination to represent the phrase "THE^CAT^SAT^ON^THE^MAT^AND^"

Figure 7N:
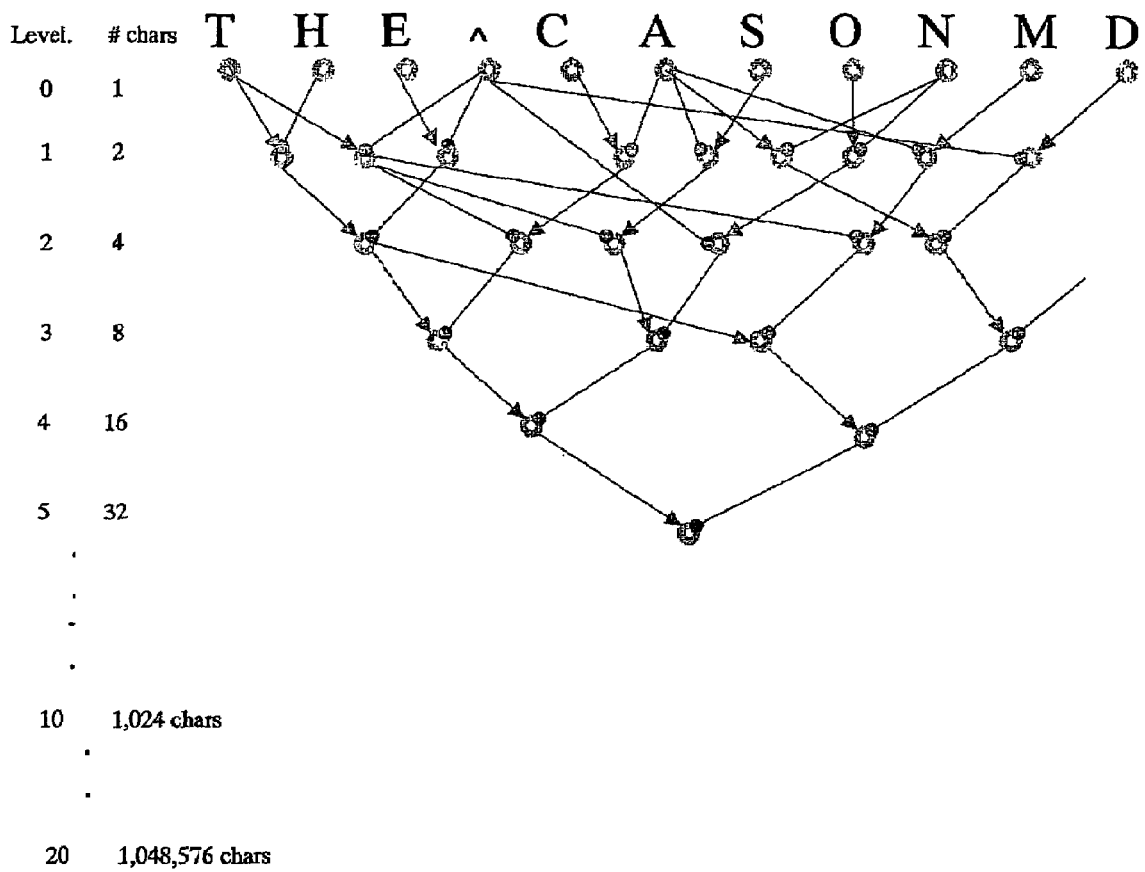

In FIG. 7(n) it shows that in level 0 each elemental neuron represents only 1 letter/character. Each neuron in level 1 represents an association of 2 letters/characters; in level 2 each neuron may represents an association of up to 4 letters/characters; in level 3 up to 8 letters characters; up to 16 letters/characters in level 4; up to 32 letters/characters in level 5; and so forth in multiples of 2 until each neuron in level 10 could represent the association of up to 1,024 letters/characters; and each neuron in level 20 could represent the association of up to 1,048,576 elemental events.

As can be seen, for text recognition the number of elemental neurons required is quite limited. One elemental neuron would be required for each of:
1. the 26 letters of the alphabet upper case;
2. the 26 letters of the alphabet lower case;
3. the 10 numbers;
4. the 32 punctuation and similar characters on the standard alphanumeric keyboard;
5. any other special characters (e.g. from the Greek alphabet) that may be required.

The number of structural neurons required and the number of levels of structured neurons required can grow in consequence of use of the neural network, during the learning process. Using the example of text recognition, the number of documents concerned, the size of the learning event(s) concerned, the use of language in the documents, and the maximum possible number of words, phrases, clauses, sentences, paragraphs, chapters, books, and so forth will impact the size of the resulting neural network structure. By way of example, if all the plays of William Shakespeare were recorded using the present invention in text recognition, after the first play was recorded there would be a certain number of structural neurons "N1". When the second play was recorded, within the same neural network, the total neurons required would not be the simple arithmetic sum of those required for the independent processing of each of the plays. Only the extra neurons required to process the second play above and beyond those created for the first play would be added to N1 to give the enlarged total N2. Neurons for any previously existing letters, words, phrases, clauses, sentences (and so forth) would not be added, but their new associations would be added. Upon the third play being recorded, the extra neurons required would be added in the same way to give N3.

By the time the final play was entered, the increase in the number of neurons required would not be great. The main increase would be at deeper levels in the neuron structure where new associations would be added. The deepest level could be a single neuron having all associations required to represent in their entirety all the plays.

As each neuron in each level can associate with any other neuron in any level to give a result at a third neuron, the number of potential permutations and combinations available is very large.

From a consideration of FIG. 7, there are different combinations that may be used to provide the result at neuron 751 "THE^CAT^SAT^ON^THE^MAT". For example, in level 1 as illustrated the following combinations are recorded:

"TH", "E^", "CA", "T^", "SA", "ON", and "MA".

Other combinations are possible. For example:

"TH", "HE", "E^", "CA", "AT", "T^", "ON", "N^", and "MA".

This can be followed by a further range of possible combinations in level 2. By adopting rules pertinent to a desired objective for using the neural network, to reduce or eliminate combinations, efficiency may be enhanced.

If a level 10 neuron is considered, it is capable of representing a sequence of up to 1,024 elementary events. The first element can be expressed by following the pointers up to the elemental or root level. This allows a relatively speedy expression.

Elemental neurons may be frequently activated both for learning and during expression. In a pure binary implementation two elemental neurons or root level neurons can be expressed or associated by a single level 1 neuron. Two level 1 neurons may be expressed or associated by a level 2 neuron and so forth. If a sequence of 1,024 elemental events is activated and learnt/expressed by the network then the following number of neurons at each level may be processed:

| | |
|---|---|
| 1,024 | level 0 |
| 512 | level 1 |
| 256 | level 2 |
| 128 | level 3 |
| 64 | level 4 |
| 32 | level 5 |
| 16 | level 6 |
| 8 | level 7 |
| 4 | level 8 |
| 2 | level 9 |
| 1 | level 10 | representing the entire sequence of elementary events.

If the basic time between neurons firing was 1 millisecond, at the root level, a level 10 neuron would only activated or fired once every 1024 milliseconds or once a second. Thus if the array representing the neural structure is represented as a combination of distinct memory blocks/areas, deeper level neurons could be stored in slower storage/memory area without impacting the performance of learning and expression.

In the preferred neural network structure, elemental neurons have as their initiating neuron the root neuron for the neural network structure. This allows an unlimited number of elemental neurons to be created on the fly, rather than having to predefine elemental neurons. Alternatively, elemental neurons can be allocated a predetermined neural storage/memory area in the structure, and each elemental neuron can then be directly addressed (e.g. for ASCII text characters 8 bits), 256 elemental neuron addresses can be pre-allocated (0 to 255) and the address of the first structural neuron will be at address 256.

In the preferred mode, new elemental neurons can be added at anytime, anywhere in the neural structure, providing for complete flexibility. When using a predefined area for the elemental neurons, processing may be faster as there is no need to search a list of successors attached to the root neuron.

Elemental neurons may be represented with their initiating neuron pointer set to zero—pointing to the root neuron (whether it exists or not), and their associated neuron pointer set to the value of the elemental event to be represented by that elemental neuron. A elemental neuron can always be determined or identified easily as its initiating neuron value is always zero. Therefore, when expressing neurons it is easy to determine when we have reached an elemental neuron because the initiating neuron value is zero, pointing to the root neuron. Alternative methods may be used to define elemental neurons, without impacting the essence of the neural network presented.

In the preferred mode, new successor neurons to an Initiating neuron are simply added to the front of the list. Therefore, they are attached directly to the initiating neuron. In this way recent memory traces are readily expressed.

However, various options are available to maintain lists of successor neurons. The neural structure allows this feature to be used in any manner the user chooses in order to provide added functionality to the neural network structure. For example, new associating neurons could be added to the end of the list, or the list could be maintained in numerical order, alphabetical order, and so forth. Likewise, neurons which are frequently accessed could be moved towards the front of the list, or at the front of the list, such that more recently activated memories are always more accessible. This also means that older memories are at the end of the list and less likely to experience expression.

In this manner the order of the list can be used to represent the relative synaptic strengths or activation levels of the successor neurons to an initiating neuron without having to use weights to represent the strength of synaptic connections, if so desired.

The memory represented by any neuron can be expressed by simply expressing the neurons represented by the initiating neuron pointer and then the expressing the neuron represented by the associated neuron pointer. If the initiating pointer is zero, it is possible to express the elemental value of the elemental neuron. Otherwise, the process can be repeated for the initiating pointer—express its initiating neuron pointer and its associated neuron pointer, and so forth. Thus, any neuron can be fully expressed by expressing its parts in order.

It is possible to create neural network structures representing knowledge learnt For example, if the following sentences of text are inputs:

LUCY^IS^CRYING^UNDER^THE^TABLE^.
JOHN^IS^PLAYING^IN^THE^PARK^.
PETER^IS^READING^IN^THE^CHAIR^.
MARY^IS^SLEEPING^UNDER^THE^TREE^.
JOHN^IS^RUNNING^IN^THE^RACE^.
PETER^IS^PLAYING^ON^THE^SWING^.
MARY^IS^TALKING^ON^THE^PHONE^, it is possible to create neurons that represent the following phrases or memories:

IS CRYING
IS RUNNING
IS READING
IS SLEEPING
IS PLAYING
IS TALKING

In this case "IS^" has six successor neurons.

Similarly it is possible to create the following phrases or memories:

UNDER THE TABLE
UNDER THE TREE
IN THE PARK
IN THE CHAIR
IN THE RACE
ON THE SWING
ON THE PHONE

Thus LUCY is associated with IS CRYING, but IS is associated with six different actions. By changing the expression of alternative successor neurons for IS, it is possible to express up to six different phrases/clauses:

LUCY IS CRYING
LUCY IS RUNNING
LUCY IS READING
LUCY IS SLEEPING
LUCY IS PLAYING
LUCY IS TALKING

Although only the first phrase was ever learnt, or input to the neural network, it is possible to do the same for JOHN, PETER and MARY.

Effectively it is possible to generate new expressions based on the structure IS and IS. That is:

| | |
|---|---|
| LUCY IS | IS CRYING |
| JOHN IS | IS RUNNING |
| MARY IS | IS READING |
| LUCY IS | IS SLEEPING |
| PETER IS | IS PLAYING |
| | IS TALKING |

Therefore, it is possible to create or express 30 (5×6) phrases/clauses that are all syntactically correct, and are also all semantically correct. Similarly:

| | |
|---|---|
| ON THE | THE TABLE |
| IN THE | THE PARK |
| UNDER THE | THE CHAIR |
| | THE TREE |
| | THE RACE |
| | THE SWING |
| | THE PHONE | which provides for the possibility of generating 21 phrases/clauses of this nature (3×7) which are all syntactically correct, but not all semantically correct.

Combining the two sets together gives the structure:

{*} IS {*} (*) THE {*}.

This provides for the expression of {5} IS {6}*{3} THE {7}, or 5×6×3×7=630 possible expressions, having learnt only seven input sentences. Thus the neural model allows the learning and building a neural structure of memories, and also allows the combining of those neurons or memories into new expressions or behaviour, according to user defined processes. The brain can explore new concepts or suggestions that are syntactically possible with what has previously been learnt. With millions of neurons, it is possible to express billions of syntactically correct sentences. That is, the neural network structure provides an ideal method for creative expression.

By use of a neural network described above, it is possible to have a system that:
 is able to learn;
 has expression capabilities;
 stores associations rather than data;
 has an efficient usage of computer memory and storage space; and
 is computationally efficient.

Thus the network is able to recognise patterns within patterns of associations. As such it may be of use in varying industries such as, for example, monitoring and predicting stock price movements, internet surveillance, security, computer virus detection, phrases in speech and text, clauses in speech and text, plagiarism detection, data compression, and so forth.

The neural network structure and processes described above may be implemented in software or hardware. If in hardware, they may be part of a chip, all of a dedicated chip, or an array of chips, all being elemental and or structural neurons. Elemental and structural neurons may be in part of the chip, or may be in a memory array of dedicated neurons. As all neurons exist, upon the first pass of data the first elemental neuron will learn the first element of the data. For example, the upper case letter "T" in the example used in FIG. 7. The next elemental neuron would learn the next element of the data. Again using the example of FIG. 7, the lower case letter "h". And so forth. As the elemental neurons and those in the lower levels of the neural network will be activated more frequently to create the associations in the deeper levels, they may require faster processor speeds, for best performance. Neurons at deeper levels will be activated less frequently and therefore could be stored in storage with slower processor speeds.

Therefore, there is provided a neural network based on the concepts of neurons including sensor and motor neurons, and synaptic connections. Each neuron in the brain can be represented by a single node in an array or memory in a simple manner. Neurons are fixed-length nodes in an array or memory. Each synaptic connection can be represented by pointers to other neurons within each node. Neural nodes in the array may consist solely and exclusively of pointers to other neurons in the data array. However, motor or sensor neurons contain a sensor value or motor value for interacting with the external environment. Each neuron contains connections to other neurons. If desired, neurons may also maintain other information such as, for example, the frequency of activation during learning, the number successor neurons, the number of precessor neurons, and so forth, to assist processing and to be used in the rules for creating associations, and for expression.

Elemental neurons, corresponding to sensory or motor neurons can be defined for interfacing to and interacting with external input devices or external output devices The neural network can be represented and built/constructed based on the neurons and synaptic associations, with appropriate rules for creating the neural structure and traversing the neural connections. The network learns by creating associations between neurons. For any neuron, its representation can be recalled and expressed, and exploration of multiple associations and permutations of its associations, with other neurons can be recalled or expressed. Neurons can represent memories, where a memory is defined as the expression of a neuron.

Interfacing with or learning or processing an experience of external sensory neuron events and creating memories of input experiences is represented by neurons and by new connections between neurons.

Interfacing with or learning or representing an activity of external motor neuron events and creating memories of output actions is represented by new neurons and by new connections between neurons.

The neural network can learn, it can express or recall or recollect memories, it can interact or express itself with the external environment, and has the ability to think (a process defined as exploring alternative neuron associations as described above) and to express itself creatively.

The present invention also extends to a computer usable medium comprising a computer program code or specially built digital processor chips customised to cause one or more processors to execute one or more functions to perform the methods described above.

Whilst there has been described in the foregoing description preferred embodiments of the present invention, it will be understood by those skilled in the technology that many variations or modifications is details of design, construction or operation may be made without departing from the present invention.

The invention claimed is:

1. An artificial neural network comprising:
    (a) a plurality of neurons,
    (b) each of the plurality of neurons being a processor with memory and being in an array;
    (c) the plurality of neurons comprising a plurality of elemental neurons and a plurality of structural neurons;
    (d) all elemental and structural neurons being configured to be associated with others of the elemental and structural neurons via active connections;
    (e) each elemental neuron being configured to:
        (i) represent a unique input value into the artificial neural network, the unique value being at least one selected from the group consisting of: a stimulus, an event, events, a sequence in a pattern, a sequence of events, an elemental stimulus, a defined elemental pattern, a defined elemental data element, a basic input stimulus, and an output stimulus of information being processed; and
        (ii) express that unique value as an output when activated by a structural neuron;
    (f) each structural neuron being configured to:
        (i) receive input from a pair of neurons of the plurality of neurons and with which it is an associating neuron; and
        (ii) express that input as an output to that pair of neurons to activate the pair of neurons for expression.

2. An artificial neural network as claimed in claim 1, wherein any one of the plurality of neurons is able to associate with a neuron in the plurality of neurons via the active connections to a further neuron in the plurality of neurons, the further neuron being one of the plurality of structural neurons.

3. An artificial neural network as claimed in claim 1, wherein each structural neuron represents the combined information of patterns by the pair of neurons with which it associates, the structural neuron receiving input from the pair of neurons.

4. An artificial neural network as claimed in claim 1, wherein the plurality of elemental neurons is in a root level of the neural network.

5. An artificial neural network as claimed in claim 1, wherein the pair of neurons comprises at least one selected from the group consisting of: an elemental neuron and an elemental neuron, an elemental neuron and a structural neuron, a structural neuron and an elemental neuron, and a structural neuron and a structural neuron.

6. An artificial neural network as claimed in claim 1, wherein each of the plurality of neurons is one or more selected from the group consisting of: initiating neuron, associated neuron, and associating neuron; an initiating neuron being associated with an associated neuron via connections to the associating neuron.

7. An artificial neural network as claimed in claim 6, wherein the initiating neuron, the associated neuron and the associating neuron are connected based on proximal characteristics, the proximal characteristics being at least one of: temporal, spatial, intensity, magnitude and relative position of the input being processed.

8. An artificial neural network as claimed in claim 6, wherein each initiating neuron is able to associate with a plurality of associated neurons to form a plurality of pairs of neurons.

9. An artificial neural, network as claimed in claim 6, wherein each associated neuron is able to associate with a plurality of initiating neurons to form a plurality of pairs of neurons.

10. An artificial neural network as claimed in claim 6, wherein when an initiating neuron receives input and an associated neuron receives input, the inputs are transmitted to all associating neurons of the initiating neuron and the associated neuron, the associating neuron of both the initiating neuron and the associated neuron then being activated and being able to produce output.

11. An artificial neural network as claimed in claim 10, wherein the associated neuron is activated and able to produce output in a manner selected from the group consisting of: at the same time as the initiating neuron, and after the initiating neuron.

12. An artificial neural network as claimed in claim 10, wherein the activation or production of output of the initiating neuron and the associated neuron is also based on proximal characteristics.

13. An artificial neural network as claimed in claim 12, wherein the proximal activation of or production of output from the initiating neuron and the associated neuron causes at least one selected from the group consisting of: the creation of a new associating neuron if none exists together with new connections between the initiating neuron and the new associating neuron and between the associated neuron and the new associating neuron, the strengthening of existing connections between the initiating neuron and the associating neuron and between the associated neuron and the associating neuron, and strengthening of the associating neuron.

14. An artificial neural network as claimed in claim 13, wherein the strengthening is by maintaining a frequency count of how often the associating neuron receives input from the initiating neuron and the associated neuron.

15. An artificial neural network as claimed in claim 6, wherein the associating neuron represents the sum of what is represented by the initiating neuron and the associated neuron.

16. An artificial, neural network as claimed in claim 6, wherein once the associating neuron represents a result, the result need not be created in another neuron.

17. An artificial neural network as claimed in claim 1, wherein the plurality of elemental neurons is configured to: receive all input to the artificial neural network, and provide all output from the artificial neural network.

18. An artificial neural network as claimed in claim 1, wherein all neurons represent at least one of: value, information and pattern; and
processing is at least one of: associating neurons, expressing the pair of neurons with which a structural neuron associates, and expressing the value information or pattern represented by elemental neurons.

19. An artificial neural network as claimed in claim 1, wherein a level of the neural network is a deeper level within the neural network structure if, during expression, more steps are required to express the elemental neurons that it represents.

20. An artificial neural network as claimed in claim 17, wherein associating a pair of neurons is learning, and expressing a pair of neurons is expression.

21. An artificial neural network as claimed in claim 19, wherein the artificial neural network is bi-directional with a forward mode being learning, and a reverse mode being expression.

22. An artificial neural network as claimed in claim 1, wherein the artificial neural network stores associations and not input data and represents patterns within patterns of associations.

23. An artificial neural network as claimed in claim 1, wherein each elemental neuron is selected from the group consisting of: a sensor neuron and a motor neuron.

24. An artificial neural network as claimed in claim 1, wherein each structural neuron represents a plurality of elemental neurons.

25. An artificial neural network as claimed in claim 1, wherein each of the plurality of neurons is able to be expressed.

26. An artificial neural network as claimed in claim 1, wherein the number of elemental neurons and structural neurons required for the memory is determined by the nature of the input to be processed.

27. An artificial neural network as claimed in claim 1, wherein the memory is to store a frequency of received inputs.

28. An artificial neural network as claimed in claim 6, wherein each neuron is a node in the array, each node having a plurality of pointers.

29. An artificial neural network as claimed in claim 28, wherein the plurality of pointers comprises two pointers for providing expression and further pointers to represent associations.

30. An artificial neural network as claimed in claim 28, wherein each pointer in each node contains at least one selected from the group consisting of: an address of another neuron, an elemental value for an elemental neuron, and a frequency count.

31. An artificial neural network as claimed in claim 28, wherein the number of pointers depends on a function being performed by the artificial neural network, the number of pointers for each neuron being at least two.

32. An artificial neural network as claimed in claim 28, wherein a function of each pointer to a neuron is selected from the group consisting of: initiating, associating, successor, next successor of the initiating neuron, precessor, and next precessor of the associating neuron.

33. An artificial neural network as claimed in claim 28, wherein at least one pointer for an elemental neuron represents elemental values.

34. An artificial neural network as claimed in claim 28, wherein all neurons are a fixed length addressable node in the array.

35. An artificial neural network as claimed in claim 1, wherein the artificial neural network is used for at least one selected from the group consisting of: monitoring and predicting stock price movements, Internet surveillance, Internet security, computer virus detection, computer spam detection, phrases in speech and text, clauses in speech and text, plagiarism detection, bioinformatics, vision recognition, semantic analysis, representation of data ontologies, robotics, and data compression.

36. An artificial neural network comprising:
(a) a plurality of neurons,
(b) each of the plurality of neurons being a processor with memory and being in an array;
(c) the plurality of neurons comprising a plurality of elemental neurons and a plurality of structural neurons;
(d) all elemental and structural neurons being configured to be associated with others of the elemental and structural neurons via active connections;
(e) each elemental neuron being configured to:
(i) represent a unique value able to be input into the artificial neural network system, the unique value being one of: a stimulus, an event, events, a sequence in a pattern or sequence of events; and
(ii) express that unique value as an output; and
(f) each structural neuron being configured to receive input from a pair of neurons with which it is associating, the pair of neurons being selected from the group consisting of: both elemental neurons, both structural neurons, one structural and one elemental neuron, and one elemental neuron and one structural neuron.

37. An artificial neural network as claimed in claim 36, wherein the plurality of elemental neurons are in a root level of the neural network, and each elemental neuron represents a unique value, the unique value being at least one selected from the group consisting of: a stimulus, an event, events, a sequence in a pattern, a sequence of events, an elemental stimulus, a defined elemental pattern, a defined elemental data element, a basic input stimulus, and an output stimulus of information being processed.

38. An artificial neural network as claimed in claim 36, wherein each elemental neuron is selected from the group consisting of: a sensor neuron and a motor neuron.

39. An artificial neural network as claimed in claim 36, wherein all neurons represent at least one of: value, information and pattern; and processing is at least one of: associating neurons, expressing the pair of neurons with which a structural neuron associates, and expressing the value information or pattern represented by elemental neurons.

40. An artificial neural network as claimed in claim 36, wherein neuron associations are represented in a plurality of deeper neural levels; the number of levels in the plurality of deeper levels being determined by the extent of the pattern to be processed or expressed, where a structural neuron represents a plurality of elemental neurons.

41. An artificial neural network as claimed in claim 40, wherein the number of elemental neurons and structural neurons required for the memory is determined by the nature of the input to be processed.

42. An artificial neural network as claimed in claim 36, wherein any one of the plurality of neurons is able to associate with a neuron in the plurality of neurons via the active connections to a further neuron in the plurality of neurons, the further neuron being one of the plurality of structural neurons.

43. An artificial neural network as claimed in claim 36, wherein the artificial neural network is bi-directional with a forward mode being learning, and a reverse mode being expression.

44. An artificial neural network as claimed in claim 36, wherein the artificial neural network stores associations and not input data and represents patterns within patterns of associations.

45. An artificial neural network as claimed in claim 36, wherein each of the plurality of neurons is able to be expressed.

46. An artificial neural network comprising:
  (a) a plurality of neurons,
  (b) each of the plurality of neurons being a processor with memory and being in an array;
  (c) the plurality of neurons comprising a plurality of elemental neurons and a plurality of structural neurons;
  (d) all elemental and structural neurons being configured to be associated with others of the elemental and structural neurons via active connections;
  (e) each elemental neuron being configured to:
    (i) represent a unique value able to be input into the artificial neural network system, the unique value being at least one selected from the group consisting of: a stimulus, an event, events, a sequence in a pattern, a sequence of events, an elemental stimulus, a defined elemental pattern, a defined elemental data element, a basic input stimulus, and an output stimulus of information being processed; and
    (ii) express that unique value as an output;
  (f) all of the plurality of structural neurons being able to be expressed in terms of the elemental neurons from which they were derived or represent.

47. An artificial neural network as claimed in claim 46, wherein the artificial neural network is bi-directional with a forward mode being learning, and a reverse mode being expression.

48. An artificial neural network as claimed in claim 46, wherein the artificial neural network stores associations and not input data and recognizes patterns within patterns of associations.

49. An artificial neural network as claimed in claim 46, wherein the neural network is bi-directional with all elemental neurons being able to express their elemental values, and all structural neurons being able to express a pair of neurons with which they associate.

50. An artificial neural network comprising:
  (a) a plurality of neurons,
  (b) each of the plurality of neurons being a processor with memory and being a node in an array;
  (c) the plurality of neurons comprising a plurality of elemental neurons and a plurality of structural neurons;
  (d) all elemental and structural neurons being configured to be associated with others of the elemental and structural neurons via connections;
  (e) the artificial neural network being bi-directional and being able to operate in a forward mode where structural neurons are created from input events from the elemental neurons, and in a reverse mode where input events are expressed by the elemental neurons.

51. An artificial neural network as claimed in claim 50, wherein the forward mode is learning, and the reverse direction is expression.

52. An artificial neural network as claimed in claim 50, wherein the neural network stores associations and not input data.

53. An artificial neural network as claimed in claim 50, wherein the neural network represents and recognizes patterns within patterns of associations.

54. A neuronal assembly of an artificial neural network, the neuronal assembly comprising an initiating neuron, an associated neuron, and an associating neuron operatively connected with the initiating neuron and the associated neuron; the associating neuron representing the sum of what is represented by the initiating neuron and the associated neuron, and once the associating neuron represents a result, the result need not be created in another neuron.

55. A neuronal assembly as claimed in claim 54, wherein the artificial neural network is as claimed in claim 1.

56. A neuronal assembly as claimed in claim 54, wherein when an initiating neuron receives input and an associated neuron receives input, the inputs are transmitted to all associating neurons of the initiating neuron and the associated neuron, the associating neuron of both the initiating neuron and the associated neuron then being activated and being able to produce output.

57. A neuronal assembly as claimed in claim 56, wherein the associated neuron is able to produce output in a manner selected from the group consisting of: at the same time as the initiating neuron, and after the initiating neuron.

58. A neuronal assembly as claimed in claim 56, wherein the activation of or producing of output from of the initiating neuron and the associated neuron is based on proximal characteristics.

59. A neuronal assembly as claimed in claim 58, wherein the proximal activation of or producing of output from the initiating neuron and the associated neuron causes at least one selected from the group consisting of: the creation of a new associating neuron if none exists together with new connections between the initiating neuron and the new associating neuron and between the associated neuron and the new associating neuron, the strengthening of existing connections between the initiating neuron and the associating neuron and between the associated neuron and the associating neuron, and strengthening of the associating neuron.

60. A method for creating an association of neurons in an artificial neural network having a plurality of neurons, one of the plurality of neurons being an initiating neuron, another of the plurality of neurons being an associated neuron operatively connected with the initiating neuron, and a further neuron of the plurality of neurons being an associating neuron operatively connected with the initiating neuron and the associated neuron; the method comprising:
  activating or producing an output from the initiating neuron to potentiate the associating neuron; and
  activating or producing an output from the associated neuron to potentiate and activate the associating neuron, the associating neuron then being activated and able to produce an output; the associating neuron representing the sum of what is represented by the initiating neuron and the associated neuron, and once the associating neuron represents a result, the result need not be created in another neuron.

61. A method as claimed in claim 60, wherein the associating neuron is expressed by the associating neuron expressing the initiating neuron and the associated neuron.

62. A method as claimed in claim 60, wherein the associated neuron is activated or produces an output in a manner selected from the group consisting of: at the same time as the initiating neuron, and after the initiating neuron.

63. A method as claimed in claim 60, wherein the activation of or producing an output by the initiating neuron and the activation of or producing an output by the associated neuron is based on proximal characteristics.

64. A method as claimed in claim 63, wherein the proximal activation of or producing output from the initiating neuron and the associated neuron causes at least one selected from the group consisting of: the creation of a new associating neuron if none exists together with new connections between the initiating neuron and the new associating neuron and between the associated neuron and the new associating neuron, the strengthening of existing connections between the initiating neuron and the associating neuron and between the associated neuron and the associating neuron, and strengthening of the associating neuron.

65. A method as claimed in claim 60, wherein the associating neuron represents the sum of what is learnt from the initiating neuron and the associated neuron.

66. A method as claimed in claim 64, wherein once the new associating neuron is created to represent a result, the result need not be created in another neuron.

67. A method as claimed in claim 60, wherein once the associating neuron represents a result, the result need not be created in another neuron.

68. A method of constructing an artificial neural network comprising a plurality of neurons, the plurality of neurons comprising a plurality of elemental neurons and a plurality of structural neurons, the method comprising:
   defining unique events the elemental neurons will represent;
   creating a required number of elemental neurons for the total number of unique values to be represented for all defined events; the unique value being at least one selected from the group consisting of: a stimulus, an event, events, a sequence in a pattern, a sequence of events, an elemental stimulus, a defined elemental pattern, a defined elemental data element, a basic input stimulus, and an output stimulus of information being processed;
   the plurality of elemental neurons receiving all input to the artificial neural network, all output from the artificial neural network being from the plurality of elemental neurons;
   creating the plurality of structural neurons, each of the structural neurons being created by the association of a pair of the plurality of neurons;
   each of the plurality of structural neurons being configured to produce an output on activation by the pair of neurons, the pair of neurons comprising an initiating neuron and an associated neuron;
   the association of the plurality of neurons being based on proximal characteristics; and
   each of the plurality of structural neurons being configured to express the pair of neurons.

69. A method as claimed in claim 68, wherein any one of the plurality of neurons is able to associate with a neuron in the plurality of neurons via active connections to a further neuron in the plurality of neurons, the further neuron being one of the plurality of structural neurons.

70. A method as claimed in claim 68 wherein all elemental neurons are able to express their elemental values, and all structural neurons are able to express a the pair of neurons with which they associate.

71. A method as claimed in claim 70, wherein the pair of neurons is selected from the group consisting of: an elemental neuron with an elemental neuron, an elemental neuron with a structural neuron, a structural neuron with an elemental neuron, a structural neuron with a structural neuron.

72. A method as claimed in claim 68, wherein each of the plurality of neurons is one or more selected from the group consisting of: initiating neuron, associating neuron, and associating neuron; an initiating neuron being associated with an associated neuron via connections to the associating neuron.

73. A method as claimed in claim 72, wherein the initiating neuron, the associated neuron and the associating neuron are connected based on proximal characteristics selected from the group consisting of: temporal, spatial, intensity, magnitude and relative position of the input being processed.

74. A method as claimed in claims 68, wherein a level of the neural network is a deeper level within the artificial neural network if, during recollection, more steps are required to express the elemental neurons.

75. A method as claimed in claim 72, wherein when an initiating neuron receives input and an associated neuron receives input, the inputs are transmitted to all associating neurons of the initiating neuron and the associated neuron respectively, the associating neuron of both the initiating neuron and the associated neuron then being activated and being able to produce output.

76. A method as claimed in claim 75, wherein the associated neuron is activated or an output produced in a manner selected from the group consisting of: at the same time as the initiating neuron, and after the initiating neuron.

77. A method as claimed in claim 75, wherein the activation of or producing an output from the initiating neuron and the activation of or producing an output from the associated neuron is based on proximal characteristics.

78. A method as claimed in claim 77, wherein the proximal activation of or producing an output from the initiating neuron and the associated neuron causes at least one selected from the group consisting of: the creation of a new associating neuron including new synaptic connections between the initiating neuron and the new associating neuron and between the associated neuron and the new associating neuron, the strengthening of existing synaptic connections between the initiating neuron and the associating neuron and between the associated neuron and the associating neuron, and the strengthening of the associating neuron.

79. A method as claimed in claim 78, wherein the strengthening is by maintaining a frequency count of how often the associating neuron receives input from the initiating neuron and the associated neuron.

80. A method as claimed in claim 72, wherein the associating neuron represents the sum of what is represented by the initiating neuron and the associated neuron.

81. A method as claimed in claim 68, wherein a memory represents a plurality of elemental stimuli, and each elemental stimulus is represented directly by an elemental neuron.

82. A method as claimed in claim 68, wherein the number of elemental neurons required to represent the memory is determined by the nature of the input being processed.

83. A method as claimed in claim 68, wherein each neuron is represented by an addressable node in an array, each node having a plurality of pointers.

84. A method as claimed in claim 68, wherein the plurality of elemental neurons is in a root level of the neural network.

85. A method as claimed in claim 72, wherein each initiating neuron is able to associate with a plurality of associated neurons to form a plurality of pairs of neurons.

86. A method as claimed in claim 72, wherein each associated neuron is able to associate with a plurality of initiating neurons to form a plurality of pairs of neurons.

87. A method as claimed in claim 72, wherein once the associating neuron represents a result, the result need not be created in another neuron.

88. A method as claimed in claim 68, wherein the plurality of elemental neurons is configured to: receive all, input to the artificial neural network, and provide all output from the artificial neural network.

89. A method as claimed in claim 68, wherein all neurons represent at least one of: value, information and pattern; and processing is at least one of: associating neurons, expressing the pair of neurons with which a structural neuron associates, and expressing the value information or pattern represented by elemental neurons.

90. A method as claimed in claim 68, wherein associating a pair of neurons is learning, and expressing a pair of neurons is expression.

91. A method as claimed in claim 90, wherein the artificial neural network is bi-directional with a forward mode being learning, and a reverse mode being expression.

92. A method as claimed in claim 68, wherein the artificial neural network stores associations and not input data and represents patterns within patterns of associations.

93. A method as claimed in claim 68, wherein each elemental neuron is selected from the group consisting of: a sensor neuron and a motor neuron.

94. A method as claimed in claim 68, wherein each structural neuron represents a plurality of elemental neurons.

95. A method as claimed in claim 68, wherein each of the plurality of neurons is able to be expressed.

96. A method as claimed in claim 83, wherein the plurality of pointers comprises two pointers for providing expression and further pointers to represent associations.

97. A method as claimed in claim 96, wherein each pointer in each node contains at least one selected from the group consisting of: an address of another neuron, an elemental value for an elemental neuron, and a frequency count.

98. A method as claimed in claim 96, wherein the number of pointers depends on a function being performed by the artificial neural network, the number of pointers for each neuron being at least two.

99. A method as claimed in claim 96, wherein a function of each pointer to a neuron is selected from the group consisting of: initiating, associating, successor, next successor of the initiating neuron, precessor, and next precessor of the associating neuron.

100. A method as claimed in claim 96, wherein at least one pointer for an elemental neuron represents elemental values.

101. A method as claimed in claim 96, wherein all neurons are a fixed length addressable node in the array.

102. A method as claimed in claim 68, wherein the artificial neural network is used for at least one selected from the group consisting of: monitoring and predicting stock price movements, Internet surveillance, Internet security, computer virus detection, computer spam detection, phrases in speech and text, clauses in speech and text, plagiarism detection, bioinformatics, vision recognition, semantic analysis, representation of data ontologies, robotics, and data compression.

103. A computer usable medium comprising a computer program code configured to cause one or more processors and/or memory to execute one or more functions to perform the method claimed in claim 60.

104. A computer usable medium comprising a computer program code configured to cause one or more processors and/or memory to execute one or more functions to perform the method claimed in claim 68.

* * * * *